US007711030B2

(12) United States Patent
Perlman

(10) Patent No.: US 7,711,030 B2
(45) Date of Patent: *May 4, 2010

(54) SYSTEM AND METHOD FOR SPATIAL-MULTIPLEXED TROPOSPHERIC SCATTER COMMUNICATIONS

(75) Inventor: Stephen G. Perlman, Palo Alto, CA (US)

(73) Assignee: Rearden, LLC, San Francisco, CA (US)

( * ) Notice: Subject to any disclaimer, the term of this patent is extended or adjusted under 35 U.S.C. 154(b) by 862 days.

This patent is subject to a terminal disclaimer.

(21) Appl. No.: 11/256,478

(22) Filed: Oct. 21, 2005

(65) Prior Publication Data

US 2007/0025464 A1   Feb. 1, 2007

Related U.S. Application Data

(63) Continuation-in-part of application No. 10/902,978, filed on Jul. 30, 2004, now Pat. No. 7,418,053.

(51) Int. Cl.
    *H04L 27/30* (2006.01)
(52) U.S. Cl. .................. 375/141; 375/267; 375/299; 370/278; 370/282; 370/465; 455/101
(58) Field of Classification Search ............... 375/219, 375/222, 140, 141, 146, 147, 260, 267, 299; 375/347; 370/208, 252, 278, 282, 464, 465; 455/101
See application file for complete search history.

(56) References Cited

U.S. PATENT DOCUMENTS

| 4,253,193 A | * | 2/1981 | Kennard et al. ............. 455/101 |
| 4,564,935 A | * | 1/1986 | Kaplan ....................... 370/339 |
| 5,838,671 A |   | 11/1998 | Ishikawa et al. |
| 5,872,814 A |   | 2/1999 | McMeekin et al. |
| 6,252,912 B1 |  | 6/2001 | Salinger |

(Continued)

FOREIGN PATENT DOCUMENTS

| EP | 1 359 683 A1 | 11/2003 |
| WO | WO 03/094460 A2 | 11/2003 |
| WO | WO 03/107582 | 12/2003 |

OTHER PUBLICATIONS

Pedersen et al. (US 2007/0082674); Apr. 12, 2007; Adaptive Broadband Platforms And Methods Of Operation.*

(Continued)

*Primary Examiner*—Dac V Ha
(74) *Attorney, Agent, or Firm*—Blakely Sokoloff Taylor & Zafman LLP

(57) ABSTRACT

A method is described comprising: transmitting a training signal from each antenna of a base station to each of a plurality of client devices utilizing tropospheric scatter, each of the client devices analyzing each training signal to generate channel characterization data, and transmitting the channel characterization data back to the base station utilizing tropospheric scatter; storing the channel characterization data for each of the plurality of client devices; receiving data to be transmitted to each of the client devices; and precoding the data using the channel characterization data associated with each respective client device to generate precoded data signals for each antenna of the base station; and transmitting the precoded data signals through each antenna of the base station to each respective client device.

16 Claims, 17 Drawing Sheets

U.S. PATENT DOCUMENTS

| | | | |
|---|---|---|---|
| 6,400,761 | B1 | 6/2002 | Smee et al. |
| 6,442,151 | B1 | 8/2002 | H'mimy et al. |
| 6,473,467 | B1 | 10/2002 | Wallace et al. |
| 6,760,388 | B2 | 7/2004 | Ketchum et al. |
| 6,771,706 | B2 | 8/2004 | Ling et al. |
| 6,785,341 | B2 | 8/2004 | Walton et al. |
| 6,791,508 | B2 | 9/2004 | Berry et al. |
| 6,801,580 | B2 | 10/2004 | Kadous |
| 6,862,271 | B2 | 3/2005 | Medvedev et al. |
| 7,006,043 | B1 | 2/2006 | Nalbandian |
| 7,013,144 | B2 | 3/2006 | Yamashita et al. |
| 7,072,413 | B2 | 7/2006 | Walton et al. |
| 7,072,693 | B2 | 7/2006 | Farlow et al. |
| 7,116,723 | B2 | 10/2006 | Kim et al. |
| 7,154,936 | B2 | 12/2006 | Bjerke et al. |
| 7,167,684 | B2 | 1/2007 | Kadous et al. |
| 7,197,082 | B2 | 3/2007 | Alexiou et al. |
| 7,197,084 | B2 | 3/2007 | Ketchum |
| 7,248,879 | B1 | 7/2007 | Walton et al. |
| 7,272,294 | B2 | 9/2007 | Zhou et al. |
| 7,310,680 | B1 | 12/2007 | Graham et al. |
| 7,412,212 | B2 | 8/2008 | Hottinen |
| 7,418,053 | B2 * | 8/2008 | Perlman et al. ............. 375/267 |
| 7,437,177 | B2 | 10/2008 | Ozluturk et al. |
| 2003/0048753 | A1 | 3/2003 | Jalali |
| 2003/0125040 | A1 | 7/2003 | Walton et al. |
| 2003/0156056 | A1 | 8/2003 | Perry |
| 2003/0161282 | A1 | 8/2003 | Medvedev et al. |
| 2004/0136349 | A1 | 7/2004 | Walton et al. |
| 2004/0179627 | A1 | 9/2004 | Ketchum et al. |
| 2004/0190636 | A1 | 9/2004 | Oprea |
| 2004/0252632 | A1 | 12/2004 | Bourdoux et al. |
| 2005/0003865 | A1 | 1/2005 | Lastinger et al. |
| 2005/0020237 | A1 | 1/2005 | Alexiou |
| 2005/0041750 | A1 | 2/2005 | Lau |
| 2005/0041751 | A1 | 2/2005 | Nir et al. |
| 2005/0043031 | A1 | 2/2005 | Cho et al. |
| 2005/0047515 | A1 | 3/2005 | Walton et al. |
| 2005/0111599 | A1 | 5/2005 | Walton et al. |
| 2005/0169396 | A1 | 8/2005 | Baier et al. |
| 2006/0050804 | A1 | 3/2006 | Leclair |
| 2007/0082674 | A1 | 4/2007 | Pedersen et al. |

OTHER PUBLICATIONS

Gesbert, D., et al., From Theory to Practice: An Overview of MIMO Space-Time Coded Wireless Systems, pp. 281-302, IEEE Journal On Selected Areas In Communications, vol. 21, No. 3, Apr. 2003.

Gesbert, D., et al., "Outdoor MIMO Wireless Channels: Models and Performance Predicition", pp. 1926-1934, IEEE Transactions On Communications, vol. 50, No. 12, Dec. 2002.

Vivato, Home page, 1 page, printed Apr. 9, 2004, http://www.vivato.net/.

Haarp, Home page, High Frequency Active Auroral Research Program, 1 page, printed Apr. 9, 2004, http://www.haarp.alaska.edu/.

Airgo, Home page, 1 page, printed Apr. 9, 2004, http://www.airgonetworks.com/.

Dohler, M, et al., "A step towards MIMO: Virtual Antenna Arrays", pp. 9, European Cooperation in the field of Scientific and Technical Research, Jan. 15-17, 2003.

Propagation, 2 pgs, printed Oct. 21, 2005, http://home.planet.nl/~alphe078/propagat1.htm.

Office Action from U.S. Appl. No. 10/817,731, mailed Jan. 21, 2009, 23 pgs.

Office Action from U.S. Appl. No. 11/894,394, mailed Oct. 28, 2008, 13 pgs.

Office Action from U.S. Appl. No. 11/894,362, mailed Oct. 29, 2008, 17 pgs.

Office Action from U.S. Appl. No. 11/894,540, mailed Oct. 29, 2008, 13 pgs.

PCT "Notification of Transmittal of the International Search Report and the Written Opinion of the International Searching Authority, or the Declaration", Application No. PCT/US06/41009, mailed May 24, 2007, 6 pages.

"Electromagnetic-Wave Propagation", HW SAMS Publishers, Reference Data for Radio Engineers, "Electromagnetic-Wave Propagation", 5th Edition, 1973, Chapter 26,, (1973), 1-32.

"IntelliCell: A Fully Adaptive Approach to Smart Antennas", ArrayComm, (2002), 1-18 pgs.

"MIMO System Uses SDMA for IEEE802.11n", http://www.electronicstalk.com/news/ime/ime149.html, (Jul. 14, 2004), 1-3 pgs.

Fella, Adlane , "Adaptive WiMAX Antennas: The promise of higher ROI", http://www.wimax.com/commentary/spotlight/spotlight8-08-2005/?searchterm=Adlane Fella, (Aug. 8, 2005), 1-3 pgs.

Spencer, Quentin H., et al., "Adaptive Antennas and MIMO Systems for Wireless Communications", An Introduction to the Multi-User MIMO Downlink, IEEE Communications Magazine (Oct. 2004), 62-67 pgs.

Notice of Allowance from U.S. Appl. No. 11/894,394, mailed Jun. 26, 2009, 5 pp.

Benedetto, M.D., et al., "Analysis of the effect of the I/Q baseband filter mismatch in an OFDM modem", *Wireless personal communications*, (2000), 175-186.

Besson, O., et al., "On parameter estimation of MIMO flat-fading channels with frequency offsets", *Signal Processing, IEEE Transactions on* [see also Acoustics, Speech, and Signal Processing, IEEE Transactions on], vol. 51, No. 3, (Mar. 2003), 602-613.

Catreux, Severine , et al., "Adaptive modulation and MIMO coding for broadband wireless data networks", *IEEE Comm. Mag., vol. 2*, (Jun. 2002), 108-115.

Chen, Runhua , et al., "Transmit selection diversity for unitary precoded multiuser spatial multiplexing systems with linear receivers", *accepted to IEEE Trans. On Signal Processing*, (Aug. 2005), 1-30.

Choi, L.U. , et al., "A transmit preprocessing technique for multiuser MIMO systems using a decomposition approach", *IEEE Trans. Wireless Comm., vol. 3*, (Jan. 2004), 20-24.

Choi, Wan , et al., "Opportunistic space division multiple access with beam selection", *to appear in IEEE Trans. On Communications*, (May 19, 2006), 1-23.

Chu, D , et al., "Polyphase codes with good periodic correlation properties (corresp.)", *IEEE Trans. Inform. Theory, vol. 18, No. 4* (Jul. 1972), 531-532.

Coulson, J , et al., "Maximum likelihood synchronization for OFDM using a pilot symbol: analysis", *IEEE J. Select. Areas Commun., vol. 19, No. 12*, (Dec. 2001), 2495-2503.

Dai, X , et al., "Carrier frequency offset estimation for OFDM/SDMA systems using consecutive pilots", *IEEE Proceedings- Communications, vol. 152*, (Oct. 2005), 624-632.

Dietrich, Carl B., et al., "Spatial, polarization, and pattern diversity for wireless handheld terminals", *Proc. IEEE Antennas and Prop. Symp., vol. 49*, (Sep. 2001), 1271 - 1281.

Dong, Liang , et al., "Multiple-input multiple-output wireless communication systems using antenna pattern diversity", *Proc. IEEE Glob. Telecom. Conf., vol. 1*, (Nov. 2002), 997 - 1001.

Fakhereddin, M.J. , et al., "Combined effect of polarization diversity and mutual coupling on MIMO capacity", Proc. *IEEE Antennas and Prop. Symp., vol. 2*, (Jun. 2003), 495-498.

Fletcher, P.N., et al., "Mutual coupling in multi-element array antennas and its influence on MIMO channel capacity", *IEEE Electronics Letters, vol. 39*, ( Feb. 2003), 342-344.

Forenza, Antonio , et al., "Adaptive MIMO transmission for exploiting the capacity of spatially correlated channels", *IEEE Trans. On Veh. Tech., vol. 56, n. 2*, (Mar. 2007), 619-630.

Forenza, Antonio , et al., "Benefit of Pattern Diversity Via 2-element Array of Circular Patch Antennas in Indoor Clustered MIMO Channels'", *IEEE Trans. On Communications, vol. 54, No. 5*, (May 2006), 943-954.

Forenza, Antonio , et al., "Impact of antenna geometry on MIMO communication in indoor clustered channels", *Proc. IEEE Antennas and Prop. Symp., vol. 2*, (Jun. 2004), 1700 - 1703.

Forenza, Antonio, et al., "Switching Between OSTBC and Spatial Multiplexing with Linear Receivers in Spatially Correlated MIMO Channels", *IEEE*, (2006), 1-5.

Foschini, G.J., et al., "Simplified processing for high spectral efficiency wireless communication employing multi-element arrays", *IEEE Jour. Select. Areas in Comm.*, vol. 17, No. 11, (Nov. 1999), 1841-1852.

Fusco, T, et al., "Blind Frequency-offset Estimation for OFDM/OQAM Systems", *IEEE Transactions on [see also Acoustics, Speech, and Signal Processing, IEEE Transactions on]* vol. 55, (2007), 1828-1838.

Ghogho, M, et al., "Training design for multipath channel and frequency offset estimation in MIMO systems", *Signal Processing, IEEE Transactions on [see also Acoustics, Speech, and Signal Processing, IEEE Transactions on]*, vol. 54, No. 10, (Oct. 2006), 3957-3965.

Haring, L., "Residual carrier and sampling frequency synchronization in multiuser OFDM systems", *VTC -Spring. IEEE 63rd Vehicular Technology Conference*, vol. 4, (2006), 1937-1941.

Heath, Robert W., et al., "Antenna selection for spatial multiplexing systems with linear receivers", *IEEE Trans. Comm.*, vol. 5, (Apr. 2001), 142-144).

Heath, Robert W., et al., "Switching between diversity and multiplexing in MIMO systems", *IEEE Trans. Comm.*, vol. 53, No. 6, (Jun. 2005), 962 - 968.

Jungnickel, V., et al., "Capacity of MIMO systems with closely spaced antennas", *IEEE Comm. Lett.*, vol. 7 (Aug. 2003), 361-363.

Kannan, T.P., et al., "Separation of cochannel signals under imperfect timing and carrier synchronization", *IEEE Trans. Veh. Technol.*, vol. 50, No. 1, (Jan. 20010 79-96.

Lang, S, et al., "Design and development of a 5.25 GHz software defined wireless OFDM communication platform", *IEEE Communications Magazine*, vol. 42, No. 6, (Jun. 2004), 6-12.

Lee, K, et al., "Frequency-offset estimation for MIMO and OFDM systems using orthogonal training sequences", *IEEE Trans. VEH. Technol.*, vol. 56, No. 1, (Jan. 2007), 146-156.

Luise, M, et al., "Carrier frequency acquisition and tracking for OFDM systems", *IEEE Trans. Commun.*, vol. 44, No. 11, (Nov. 1996), 1590-1598.

Luise, M, et al., "Low-complexity blind carrier frequency recovery for OFDM signals over frequency-selective radio channels", *IEEE Trans. Commun.*, vol. 50, No. 7, (Jul. 2002), 1182-1188.

Mattheijssen, Paul, "Antenna-pattern diversity versus space diversity for use at handhelds", *IEEE Trans. on Veh. Technol.*, vol. 53, (Jul. 2004), 1035 - 1042.

McKay, Matthew R., et al., "A throughput-based adaptive MIMO-BICM approach for spatially correlated channels", *to appear in Proc. IEEE ICC*, (Jun. 2006), 1-5.

Mckay, Matthew R., et al., "Multiplexing/beamforming switching for coded MIMO in spatially correlated Rayleigh channels", *IEEE Transactions on Vehicular*.

McLean, James S., et al., "A re-examination of the fundamental limits on the radiation Q of electrically small antennas", *IEEE Trans. Antennas Propagat.*, vol. 44, No. 5, (May 1996), 672-676.

Minn, et al., "A robust timing and frequency synchronization for OFDM systems", *IEEE Trans. Wireless Commun.*, vol. 2, No. 4, (Jul. 2003), 822-839.

Moose, Paul H., et al., "A technique for orthogonal frequency division multiplexing frequency offset correction", *IEEE Trans. Commun.*, vol. 42, No. 10, (Oct. 1994), 2908- 2914.

Morelli, M, et al., "An improved frequency offset estimator for OFDM applications", *IEEE Commun. Lett.*, vol. 3, No. 3, (Mar. 1999), 75-77.

Morelli, M, et al., "Frequency ambiguity resolution in OFDM systems", *IEEE Commun. Lett.*, vol. 4, No. 4, (Apr. 2000), 134-136.

Morris, Matthew L., et al., "Network model for MIMO systems with coupled antennas and noisy amplifiers", *IEEE Trans. Antennas Propagat.*, vol. 53, (Jan. 2005), 545-552.

Oberli, C, et al., "Maximum likelihood tracking algorithms for MIMOOFDM," in Communications, *IEEE International Conference on*, vol. 4, June 20-24, (2004), 2468-2472.

Pohl, V., et al., "Antenna spacing in MIMO indoor channels", *Proc. IEEE Veh. Technol. Conf.*, vol. 2 (May 2002), 749 - 753.

Rao, R, et al., "I/Q mismatch cancellation for MIMO-OFDM systems", *In Personal, Indoor and Mobile Radio Communications, PIMRC 2004. 15th IEEE International Symposium on*, vol. 4, (2004), 2710-2714.

Rao, R.M., et al., "Multi-antenna testbeds for research and education in wireless communications", *IEEE Communications Magazine*, vol. 42, No. 12, (Dec. 2004), 72-81.

Schmidl, T.M., et al., "Robust frequency and timing synchronization for OFDM", *IEEE Trans. Commun.*, vol. 45, No. 12, (Dec. 1997), 1613-1621.

Schuchert, S, et al., "A novel I/Q imbalance compensation scheme for the reception of OFDM signals", *IEEE Transaction on Consumer Electronics*, (Aug. 2001).

Serpedin, E, et al., "Blind channel and carrier frequency offset estimation using periodic modulation precoders", *Signal Processing, IEEE Transactions on [see also Acoustics, Speech, and Signal Processing, IEEE Transactions on]*, vol. 48, No. 8, (Aug. 2000), 2389-2405.

Sharif, M., et al., "On the capacity of MIMO broadcast channel with partial side information", *IEEE Trans. Info. Th.*, vol. 51, (Feb. 2005), 506-522.

Shen, Zukang, et al., "Low complexity user selection algorithms for multiuser MIMO systems with block diagonalization",accepted for publication in *IEEE Trans. Sig Proc*, (Sep. 2005) , 1-12.

Shen, Zukang, et al., "Sum capacity of multiuser MIMO broadcast channels with block diagonalization", submitted to *IEEE Trans. Wireless Comm.*, (Oct. 2005), 1-12.

Shi, K, et al., "Coarse frame and carrier synchronization of OFDM systems: a new metric and comparison", *IEEE Trans. Wireless Commun.*, vol. 3, No. 4, (Jul. 2004), 1271-1284.

Shiu, Da-Shan, et al., "Fading correlation and its effect on the capacity of multielement antenna systems", *IEEE Trans. Comm.*, vol. 48, No. 3, (Mar. 2000), 502- 513.

Spencer, Quentin H., et al., "Zero-forcing methods for downlink spatial multiplexing in multiuser MIMO channels", *IEEE Trans. Sig. Proc.*, vol. 52, (Feb. 2004), 461-471.

Stoytchev, M., et al., "Compact antenna arrays for MIMO applications", *Proc. IEEE Antennas and Prop. Symp.*, vol. 3 (Jul. 2001), 708 - 711.

Tang, T, et al., "Joint frequency offset estimation and interference cancellation for MIMO-OFDM systems [mobile radio]", VTC2004-Fall. 2004 *IEEE 60th Vehicular Technology Conference*, vol. 3, Sept. 26-29, (2004), 1553-1557.

Tarighat, Alireza, et al., "Compensation schemes and performance analysis of IQ imbalances in OFDM receivers", *Signal Processing, IEEE Transactions on [see also Acoustics, Speech, and Signal Processing, IEEE Transactions on]*, vol. 53, (Aug. 2005), 3257-3268.

Tarighat, et al., "MIMO OFDM receivers for systems with IQ imbalances", *IEEE Trans. Sig. Proc.*, vol. 53, for orthogonal space-time block codes (OSTBC), (Sep. 2005), 3583-3596.

Tarokh, Vahid, et al., "Space-time block codes from orthogonal designs", *IEEE Trans. Info. Th.*, vol. 45, (Jul. 1999), 1456-1467.

Tureli, U, et al., "OFDM blind carrier offset estimation: ESPRIT", *IEEE Trans. Commun.*, vol. 48, No. 9, (Sep. 2000), 1459-1461.

Valkama, M, et al., "Advanced methods for I/Q imbalance compensation in communication receivers", *IEEE Trans. Sig. Proc.*, (Oct. 2001).

Van De Beek, Jan-Jaap, et al., "ML estimation of time and frequency offset in OFDM systems", *Signal Processing, IEEE Transactions on [see also Acoustics, Speech, and Signal Processing, IEEE Transactions on]* vol. 45, No. 7, (Jul. 1997), 1800-1805.

Vaughn, Rodney, et al., "Switched parasitic elements for antenna diversity", *IEEE Trans. Antennas Propagat.*, vol. 47, (Feb. 1999), 399-405.

Waldschmidt, Christian, et al., "Complete RF system model for analysis of compact MIMO arrays.", *IEEE Trans. on Vehicular Technologies*, vol. 53, (May 2004), 579-586.

Wallace, Jon W., et al., "Termination-dependent diversity performance of coupled antennas: Network theory analysis,", *IEEE Trans. Antennas Propagat.*, vol. 52, (Jan. 2004), 98-105.

Wheeler, Harold A., et al., "Small antennas", *IEEE Trans. Antennas Propagat.*, vol. AP-23, No. 4, (Jul. 1975), 462-469.

Wong, Kai-Kit, et al., "A joint-channel diagonalization for multiuser MIMO antenna systems", *IEEE Trans. Wireless Comm.,* vol. 2, (Jul. 2003), 773-786.

Zheng, Lizhong, et al., "Diversity and multiplexing: a fundamental tradeoff in multiple antenna channels", *IEEE Trans. Info. Th.,* vol. 49, No. 5, (May 2003), 1073-1096.

Zhuang, X, et al., "Channel models for link and system level simulations", *IEEE 802.16 Broadband Wireless Access Working Group,* (Sep. 2004),.

Office Action from U.S. Appl. No. 10/817,731, mailed Sep. 11, 2009, 36 pages.

Notice of Allowance from U.S. Appl. No. 11/894,362, mailed Sep. 3, 2009, 6 pages.

Notice of Allowance from U.S. Appl. No. 11/894,540, mailed Sep. 14, 2009, 6 pages.

* cited by examiner

3-Antenna Base Station with 3 Single-Antenna Client Devices

Cycling With Different Client Groups

Grouping Clients Based on Proximity

Fig. 4.4 Profile of a typical troposcatter path.

Roda, Troposcatter Links

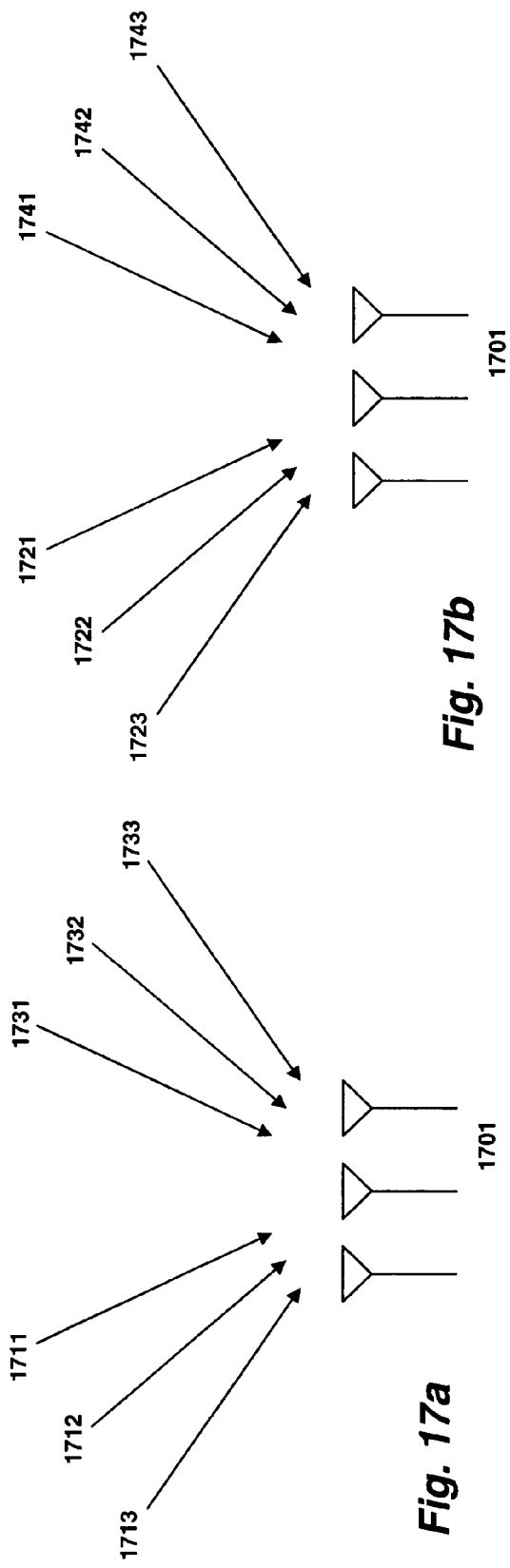
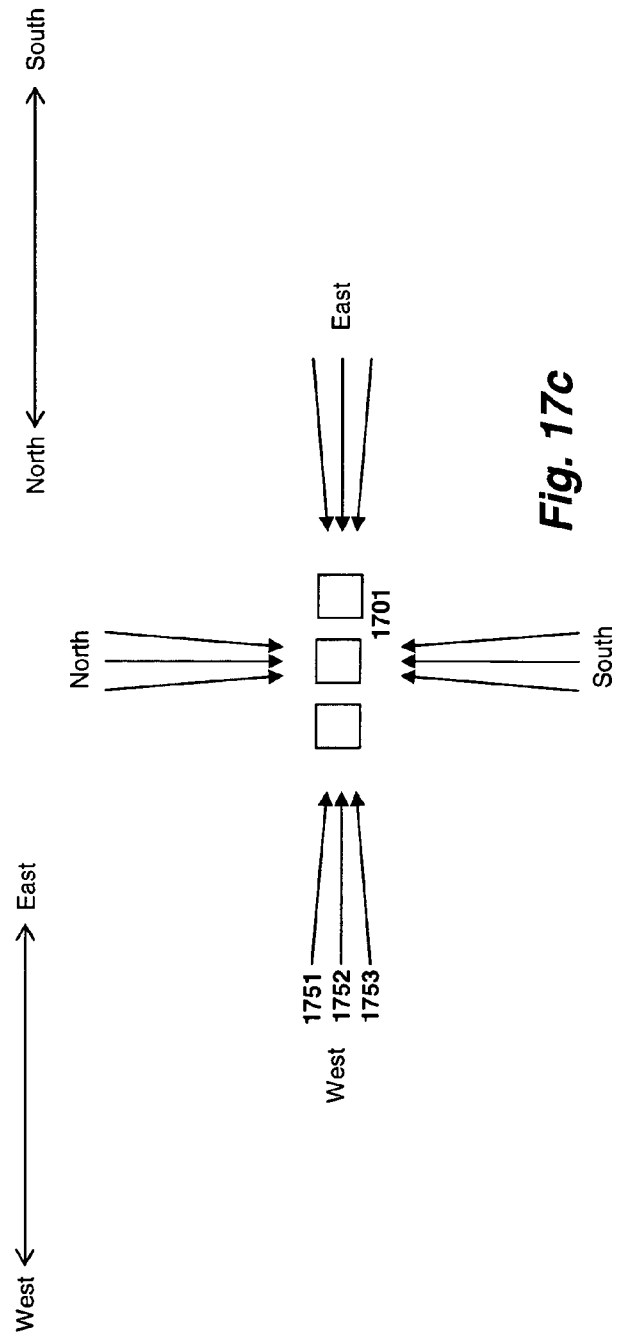
Fig. 17a
Fig. 17b
Fig. 17c

SYSTEM AND METHOD FOR SPATIAL-MULTIPLEXED TROPOSPHERIC SCATTER COMMUNICATIONS

This application is a continuation-in-part of U.S. patent application Ser. No. 10/902,978, entitled, "System And Method For Distributed Input-Distributed Output Wireless Communications" filed on Jul. 30, 2004 now U.S. Pat. No. 7,418,053.

BACKGROUND OF THE INVENTION

1. Field of the Invention

This invention relates generally to the field of communication systems. More particularly, the invention relates to a system and method for distributed input-distributed output wireless communications using space-time coding techniques.

2. Description of the Related Art

Space-Time Coding of Communication Signals

A relatively new development in wireless technology is known as spatial multiplexing and space-time coding. One particular type of space-time coding is called MIMO for "Multiple Input Multiple Output" because several antennas are used on each end. By using multiple antennas to send and receive, multiple independent radio waves may be transmitted at the same time within the same frequency range. The following articles provide an overview of MIMO:

IEEE JOURNAL ON SELECTED AREAS IN COMMUNICATIONS, VOL. 21, NO. 3, April 2003: "From Theory to Practice: An Overview of MIMO Space-Time Coded Wireless Systems", by David Gesbert, Member, IEEE, Mansoor Shafi, Fellow, IEEE, Da-shan Shiu, Member, IEEE, Peter J. Smith, Member, IEEE, and Ayman Naguib, Senior Member, IEEE.

IEEE TRANSACTIONS ON COMMUNICATIONS, VOL. 50, NO. 12, December 2002: "Outdoor MIMO Wireless Channels: Models and Performance Prediction", David Gesbert, Member, IEEE, Helmut Bölcskei, Member, IEEE, Dhananjay A. Gore, and Arogyaswami J. Paulraj, Fellow, IEEE.

Fundamentally, MIMO technology is based on the use of spatially distributed antennas for creating parallel spatial data streams within a common frequency band. The radio waves are transmitted in such a way that the individual signals can be separated at the receiver and demodulated, even though they are transmitted within the same frequency band, which can result in multiple statistically independent (i.e. effectively separate) communications channels. Thus, in contrast to standard wireless communication systems which attempt to inhibit multi-path signals (i.e., multiple signals at the same frequency delayed in time, and modified in amplitude and phase), MIMO can rely on uncorrelated or weakly-correlated multi-path signals to achieve a higher throughput and improved signal-to-noise ratio within a given frequency band. By way of example, using MIMO technology within an 802.11g system, Airgo Networks was recently able to achieve 108 Mbps in the same spectrum where a conventional 802.11g system can achieve only 54 Mbps (this is described on Airgo's website, currently at http://www.airgonetworks.com).

MIMO systems typically face a practical limitation of fewer than 10 antennas per device (and therefore less than 10× throughput improvement in the network) for several reasons:

1. Physical limitations: MIMO antennas on a given device must have sufficient separation between them so that each receives a statistically independent signal. Although MIMO bandwidth improvements can be seen with antenna spacing of even one-sixth wavelength ($\lambda/6$), the efficiency rapidly deteriorates as the antennas get closer, resulting in lower MIMO bandwidth multipliers. Also, as the antennas are crowded together, the antennas typically must be made smaller, which can impact bandwidth efficiency as well. Finally, with lower frequencies and longer wavelengths, the physical size of a single MIMO device can become unmanageable. An extreme example is in the HF band, where MIMO device antennas may have to be separated from each other by 10 meters or more.

2. Noise limitations. Each MIMO receiver/transmitter subsystem produces a certain level of noise. As more and more of these subsystems are placed in close proximity to each other, the noise floor increases. Meanwhile, as increasingly more distinct signals need to be distinguished from each other in a many-antenna MIMO system, an increasingly lower noise floor is required.

3. Cost and power limitations. Although there are MIMO applications where cost and power consumption are not at issue, in a typical wireless product, both cost and power consumption are critical constraints in developing a successful product. A separate RF subsystem is required for each MIMO antenna, including separate Analog-to-Digital (A/D) and Digital-to-Analog (D/A) converters. Unlike many aspects of digital systems which scale with Moore's Law, such analog-intensive subsystems typically have certain physical structural size and power requirements, and scale in cost and power linearly. So, a many-antenna MIMO device would become prohibitively expensive and power consumptive compared to a single-antenna device.

As a result of the above, most MIMO systems contemplated today are on the order of 2-to-4 antennas, resulting in a 2-to-4× increase in bandwidth, and some increase in SNR due to the diversity benefits of a multi-antenna system. Up to 10 antenna MIMO systems have been contemplated (particularly at higher microwave frequencies due to shorter wavelengths and closer antenna spacing), but much beyond that is impractical except for very specialized and cost-insensitive applications.

Virtual Antenna Arrays

One particular application of MIMO-type technology is a virtual antenna array. Such a system is proposed in a research paper presented at European Cooperation in the field of Scientific and Technical Research, EURO-COST, Barcelona, Spain, Jan. 15-17, 2003: Center for Telecommunications Research, King's College London, UK: "A step towards MIMO: Virtual Antenna Arrays", Mischa Dohler & Hamid Aghvami.

Virtual antenna arrays, as presented in this paper, are systems of cooperative wireless devices (such as cell phones), which communicate amongst each other (if and when they are near enough to each other) on a separate communications channel than their primary communications channel to their base station so as to operate cooperatively (e.g. if they are GSM cellular phones in the UHF band, this might be a 5 GHz Industrial Scientific and Medical (ISM) wireless band). This allows single antenna devices, for example, to potentially achieve MIMO-like increases in bandwidth by relaying information among several devices in range of each other (in addition to being in range of the base station) to operate as if they are physically one device with multiple antennas.

In practice, however, such a system is extremely difficult to implement and of limited utility. For one thing, there are now a minimum of two distinct communications paths per device that must be maintained to achieve improved throughput, with the second relaying link often of uncertain availability. Also, the devices are more expensive, physically larger, and consume more power since they have at a minimum a second communications subsystem and greater computational needs. In addition, the system is reliant on very sophisticated real-time of coordination of all devices, potentially through a variety of communications links. Finally, as the simultaneous channel utilization (e.g. the simultaneous phone call transmissions utilizing MIMO techniques) grows, the computational burden for each device grows (potentially exponentially as channel utilization increases linearly), which may very well be impractical for portable devices with tight power and size constraints.

SUMMARY OF THE INVENTION

A method is described comprising: transmitting a training signal from each antenna of a base station to each of a plurality of client devices utilizing tropospheric scatter, each of the client devices analyzing each training signal to generate channel characterization data, and transmitting the channel characterization data back to the base station utilizing tropospheric scatter; storing the channel characterization data for each of the plurality of client devices; receiving data to be transmitted to each of the client devices; and preceding the data using the channel characterization data associated with each respective client device to generate precoded data signals for each antenna of the base station; and transmitting the precoded data signals through each antenna of the base station to each respective client device.

BRIEF DESCRIPTION OF THE DRAWINGS

A better understanding of the present invention can be obtained from the following detailed description in conjunction with the drawings, in which:

FIGS. 17*a*-*c* illustrates 3 client antennas in a coverage area from different elevation views.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Figure 1:
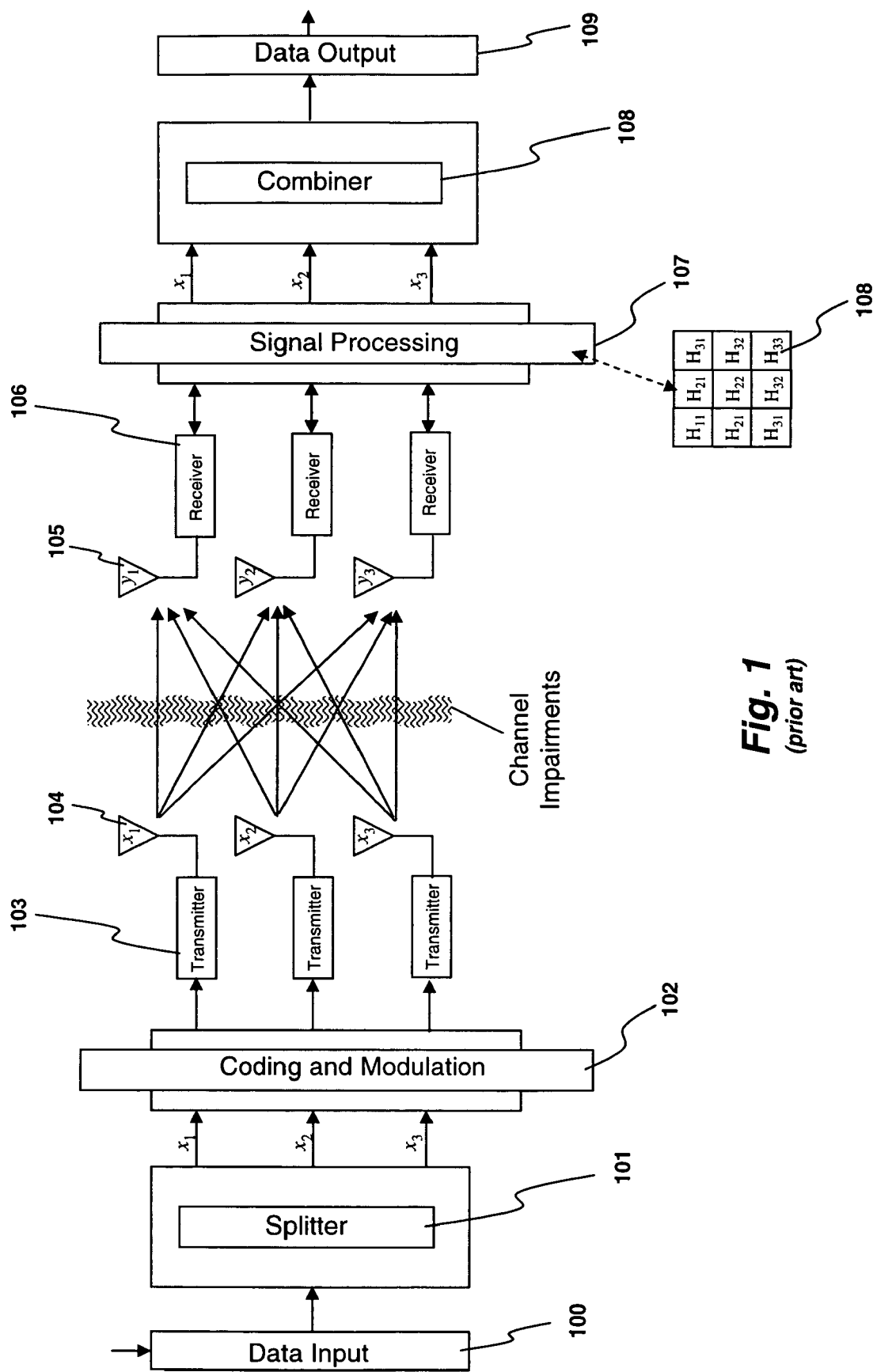
FIG. 1 illustrates a prior art MIMO system.

FIG. 1 shows a prior art MIMO system with transmit antennas 104 and receive antennas 105. Such a system can achieve up to 3× the throughput that would normally be achievable in the available channel. There are a number of different approaches in which to implement the details of such a MIMO system which are described in published literature on the subject, and the following explanation describes one such approach.

Before data is transmitted in the MIMO system of FIG. 1, the channel is "characterized." This is accomplished by initially transmitting a "training signal" from each of the transmit antennas 104 to each of the receivers 105. The training signal is generated by the coding and modulation subsystem 102, converted to analog by a D/A converter (not shown), and then converted from baseband to RF by each transmitter 103, in succession. Each receive antenna 105 coupled to its RF Receiver 106 receives each training signal and converts it to baseband. The baseband signal is converted to digital by a D/A converter (not shown), and the signal processing subsystem 107 characterizes the training signal. Each signal's characterization may include many factors including, for example, phase and amplitude relative to a reference internal to the receiver, an absolute reference, a relative reference, characteristic noise, or other factors. Each signal's characterization is typically defined as a vector that characterizes phase and amplitude changes of several aspects of the signal when it is transmitted across the channel. For example, in a quadrature amplitude modulation ("QAM")-modulated signal the characterization might be a vector of the phase and amplitude offsets of several multipath images of the signal. As another example, in an orthogonal frequency division multiplexing ("OFDM")-modulated signal, it might be a vector of the phase and amplitude offsets of several or all of the individual sub-signals in the OFDM spectrum.

The signal processing subsystem 107 stores the channel characterization received by each receiving antenna 105 and corresponding receiver 106. After all three transmit antennas 104 have completed their training signal transmissions, then the signal processing subsystem 107 will have stored three channel characterizations for each of three receiving antennas 105, resulting in a 3×3 matrix 108, designated as the channel characterization matrix, "H." Each individual matrix element $H_{i,j}$ is the channel characterization (which is typically a vector, as described above) of the training signal transmission of transmit antenna 104i as received by the receive antenna 105j.

At this point, the signal processing subsystem 107 inverts the matrix H 108, to produce $H^{-1}$, and awaits transmission of actual data from transmit antennas 104. Note that various prior art MIMO techniques described in available literature, can be utilized to ensure that the H matrix 108 can be inverted.

In operation, a payload of data to be transmitted is presented to the data Input subsystem 100. It is then divided up into three parts by splitter 101 prior to being presented to coding and modulation subsystem 102. For example, if the payload is the ASCII bits for "abcdef," it might be divided up into three sub-payloads of ASCII bits for "ad," "be," and "cf" by Splitter 101. Then, each of these sub-payloads is presented individually to the coding and modulation subsystem 102.

Each of the sub-payloads is individually coded by using a coding system suitable for both statistical independence of each signal and error correction capability. These include, but are not limited to Reed-Solomon coding, Viterbi coding, and Turbo Codes. Finally, each of the three coded sub-payloads is modulated using an appropriate modulation scheme for the channel. Example modulation schemes are differential phase shift key ("DPSK") modulation, 64-QAM modulation and OFDM. It should be noted here that the diversity gains provided by MIMO allow for higher-order modulation constellations that would otherwise be feasible in a SISO (Single Input-Single Output) system utilizing the same channel. Each coded and modulated signal is then transmitted through its own antenna 104 following D/A conversion by a D/A conversion unit (not shown) and RF generation by each transmitter 103.

Assuming that adequate spatial diversity exists amongst the transmit and receive antennas, each of the receiving antennas 105 will receive a different combination of the three transmitted signals from antennas 104. Each signal is received and converted down to baseband by each RF receiver 106, and digitized by an A/D converter (not shown). If $y_n$ is the signal received by the nth receive antenna 105, and $x_n$ is the signal transmitted by nth transmit antenna 104, and N is noise, this can be described by the following three equations.

$$y_1 = x_1 H_{11} + x_2 H_{21} + x_3 H_{31} + N$$

$$y_2 = x_1 H_{12} + x_2 H_{22} + x_3 H_{32} + N$$

$$y_3 = x_1 H_{13} + x_2 H_{23} + x_3 H_{33} + N$$

Given that this is a system of three equations with three unknowns, it is a matter of linear algebra for the signal processing subsystem 107 to derive $x_1$, $x_2$, and $x_3$ (assuming that N is at a low enough level to permit decoding of the signals):

$$x_1 = y_1 H^{-1}{}_{11} + y_2 H^{-1}{}_{12} + y_3 H^{-1}{}_{13}$$

$$x_2 = y_1 H^{-1}{}_{21} + y_2 H^{-1}{}_{22} + y_3 H^{-1}{}_{23}$$

$$x_3 = y_1 H^{-1}{}_{31} + y_2 H^{-1}{}_{32} + y_3 H^{-1}{}_{33}$$

Once the three transmitted signals $x_n$ are thus derived, they are then demodulated, decoded, and error-corrected by signal processing subsystem 107 to recover the three bit streams that were originally separated out by splitter 101. These bit streams are combined in combiner unit 108, and output as a single data stream from the data output 109. Assuming the robustness of the system is able to overcome the noise impairments, the data output 109 will produce the same bit stream that was introduced to the data Input 100.

Although the prior art system just described is generally practical up to four antennas, and perhaps up to as many as 10, for the reasons described in the Background section of this disclosure, it becomes impractical with large numbers of antennas (e.g. 25, 100, or 1000).

Typically, such a prior art system is two-way, and the return path is implemented exactly the same way, but in reverse, with each side of the communications channels having both transmit and receive subsystems.

Figure 2:
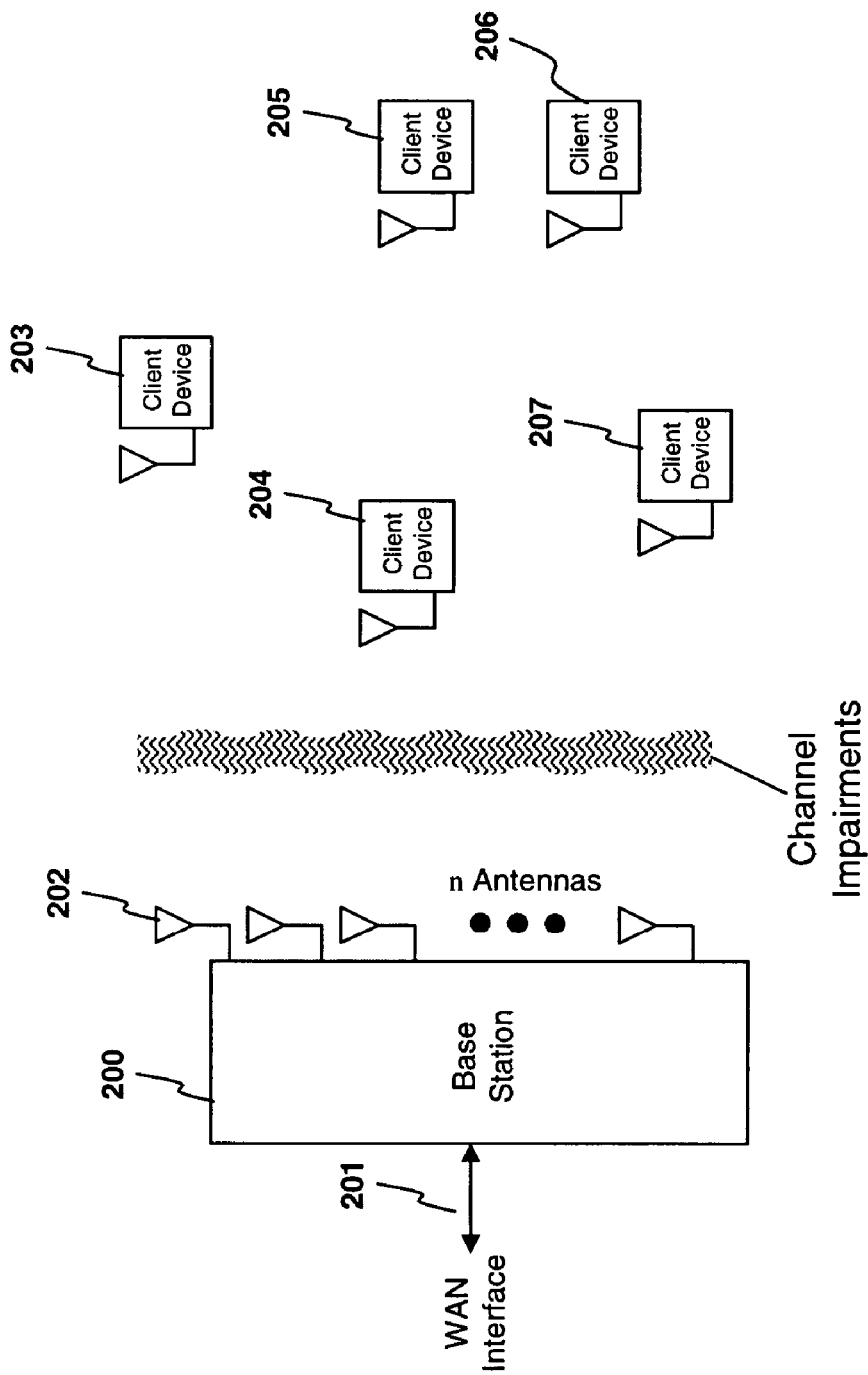
FIG. 2 illustrates an N-antenna Base Station communicating with a plurality of Single-antenna Client Devices.

FIG. 2 illustrates one embodiment of the invention in which a Base Station 200 is configured with a Wide Area Network interface (e.g. to the Internet through a T1 or other high speed connection) 201 and is provisioned with a number (n) of antennas 202. There are a number of Client Devices 203-207, each with a single antenna, which are served wirelessly from the Base Station 200. Although for the purposes of this example it is easiest to think about such a Base Station as being located in an office environment where it is serving Client Devices 203-207 that are wireless-network equipped personal computers, this architecture will apply to a large number of applications, both indoor and outdoor, where a Base Station is serving wireless clients. For example, the Base Station could be based at a cellular phone tower, or on a television broadcast tower. In one embodiment, the Base Station 200 is positioned on the ground and is configured to transmit upward at HF frequencies (e.g., frequencies up to 24 MHz) to bounce signals off the ionosphere as described in co-pending application entitled SYSTEM AND METHOD FOR ENHANCING NEAR VERTICAL INCIDENCE SKY-WAVE ("NVIS") COMMUNICATION USING SPACE-TIME CODING, Ser. No. 10/817,731, Filed Apr. 2, 2004 which is assigned to the assignee of the present application and which is incorporated herein by reference. In another embodiment, the Base Station 200 is positioned on the ground and is configured to transmit at angle into the troposphere using tropospheric scatter ("troposcatter") techniques.

Certain details associated with the Base Station 200 and Client Devices 203-207 set forth above are for the purpose of illustration only and are not required for complying with the underlying principles of the invention. For example, the Base Station may be connected to a variety of different types of wide area networks via WAN interface 201 including application-specific wide area networks such as those used for digital video distribution. Similarly, the Client Devices may be any variety of wireless data processing and/or communication devices including, but not limited to cellular phones, personal digital assistants ("PDAs"), receivers, and wireless cameras.

In one embodiment, the Base Station's n Antennas 202 are separated spatially such that each is transmitting and receiving signals which are not spatially correlated, just as if the Base Station was a prior art MIMO transceiver. As described in the Background, experiments have been done where antennas placed within λ/6 (i.e. ⅙ wavelength) apart successfully achieve an increase in bandwidth from MIMO, but generally speaking, the further apart these Base Station antennas are placed, the better the system performance, and λ/2 is a desirable minimum. Of course, the underlying principles of the invention are not limited to any particular separation between antennas.

Note that a single Base Station 200 may very well have its antennas located very far apart. For example, in the HF spectrum, the antennas may be 10 meters apart or more (e.g., in an NVIS implementation mentioned above). If 100 such antennas are used, the Base Station's antenna array could well occupy several square kilometers.

In addition to spatial diversity techniques, one embodiment of the invention polarizes the signal in order to increase the effective bandwidth of the system. Increasing channel bandwidth through polarization is a well known technique which has been employed by satellite television providers for years. Using polarization, it is possible to have multiple (e.g., three) Base Station antennas very close to each other, and still be not spatially correlated. Although conventional RF systems usually will only benefit from the diversity of two dimensions (e.g. x and y) of polarization, the architecture descried herein may further benefit from the diversity of three dimensions of polarization (x, y and z).

Figure 3:
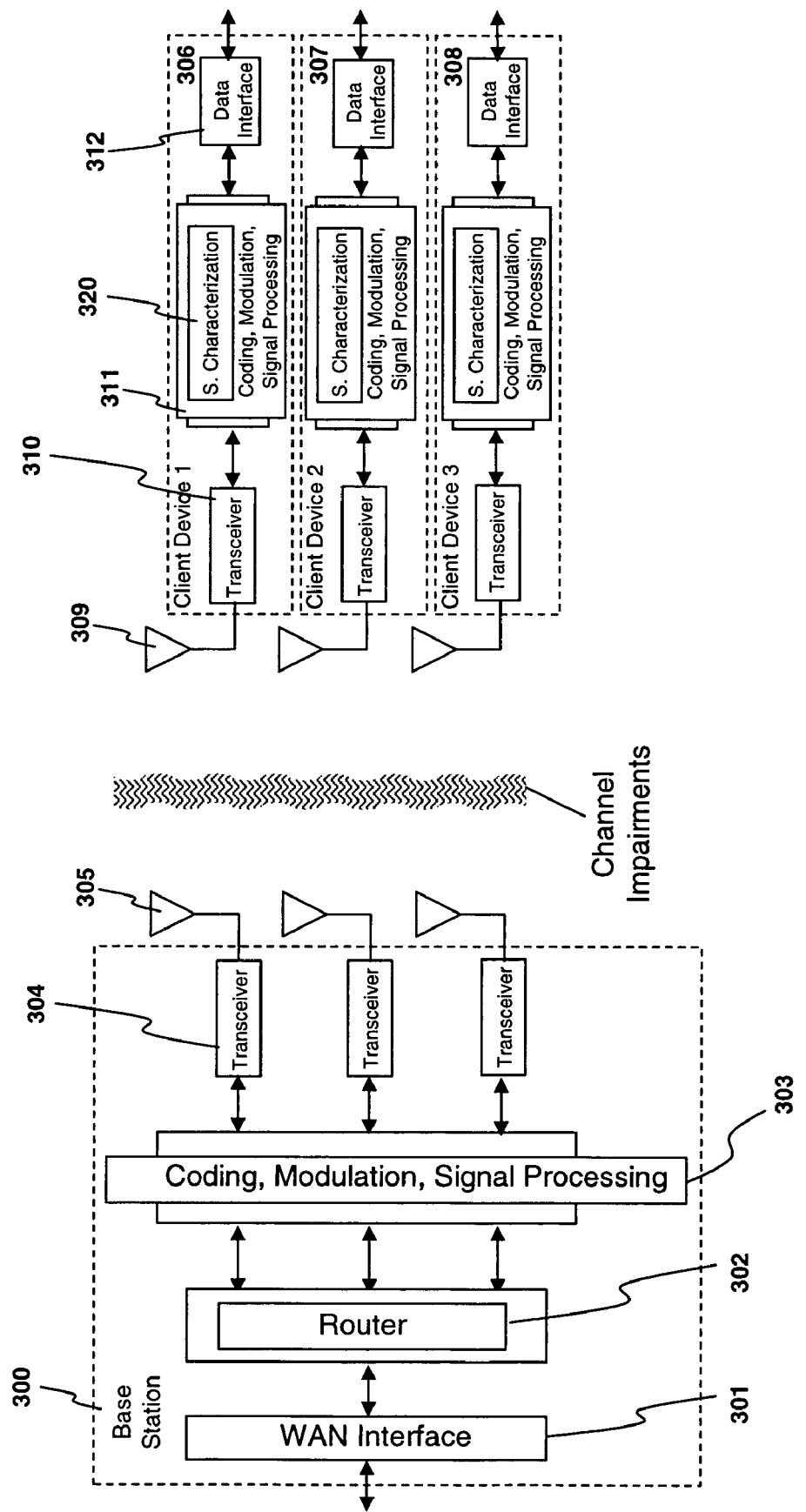
FIG. 3 illustrates a three Antenna Base Station communicating with three Single-Antenna Client Devices

FIG. 3 provides additional detail of one embodiment of the Base Station 200 and Client Devices 203-207 shown in FIG. 2. For the purposes of simplicity, the Base Station 300 is shown with only three antennas 305 and only three Client Devices 306-308. It will be noted, however, that the embodiments of the invention described herein may be implemented with a virtually unlimited number of antennas 305 (i.e., limited only by available space and noise) and Client Devices 306-308.

FIG. 3 is similar to the prior art MIMO architecture shown in FIG. 1 in that both have three antennas on each sides of a communication channel. A notable difference is that in the prior art MIMO system the three antennas 105 on the right side of FIG. 1 are all a fixed distance from one another (e.g., integrated on a single device), and the received signals from each of the antennas 105 are processed together in the Signal Processing subsystem 107. By contrast, in FIG. 3, the three antennas 309 on the right side of the diagram are each coupled to a different Client Device 306-308, each of which may be distributed anywhere within range of the Base Station 305. As such, the signal that each Client Device receives is processed independently from the other two received signals in its Coding, Modulation, Signal Processing subsystem 311. Thus, in contrast to a Multiple-Input (i.e. antennas 105) Multiple-Output (i.e. antennas 104) "MIMO" system, FIG. 3 illustrates a Multiple Input (i.e. antennas 309) Distributed Output (i.e. antennas 305) system, referred to hereinafter as a "MIDO" system.

The MIDO architecture shown in FIG. 3 achieves a similar bandwidth increase as MIMO over a SISO system for a given number of transmitting antennas. However, one difference between MIMO and the particular MIDO embodiment illustrated in FIG. 3 is that, to achieve the bandwidth increase provided by multiple base station antennas, each MIDO Client Device 306-308 requires only a single receiving antenna, whereas with MIMO, each Client Device requires as least as many receiving antennas as the bandwidth multiple that is hoped to be achieved. Given that there is usually a practical limit to how many antennas can be placed on a Client Device (as explained in the Background), this typically limits MIMO systems to between four to ten antennas (and 4× to 10× bandwidth multiple). Since the Base Station 300 is typically serving many Client Devices from a fixed and powered location, is it practical to expand it to far more antennas than ten, and to separate the antennas by a suitable distance to achieve spatial diversity. As illustrated, each antenna is equipped with a transceiver 304 and a portion of the processing power of a Coding, Modulation, and Signal Processing section 303. Significantly, in this embodiment, no matter how much Base Station 300 is expanded, each Client Device 306-308 only will require one antenna 309, so the cost for an individual user Client Device 306-308 will be low, and the cost of Base Station 300 can be shared among a large base of users.

Figure 4:
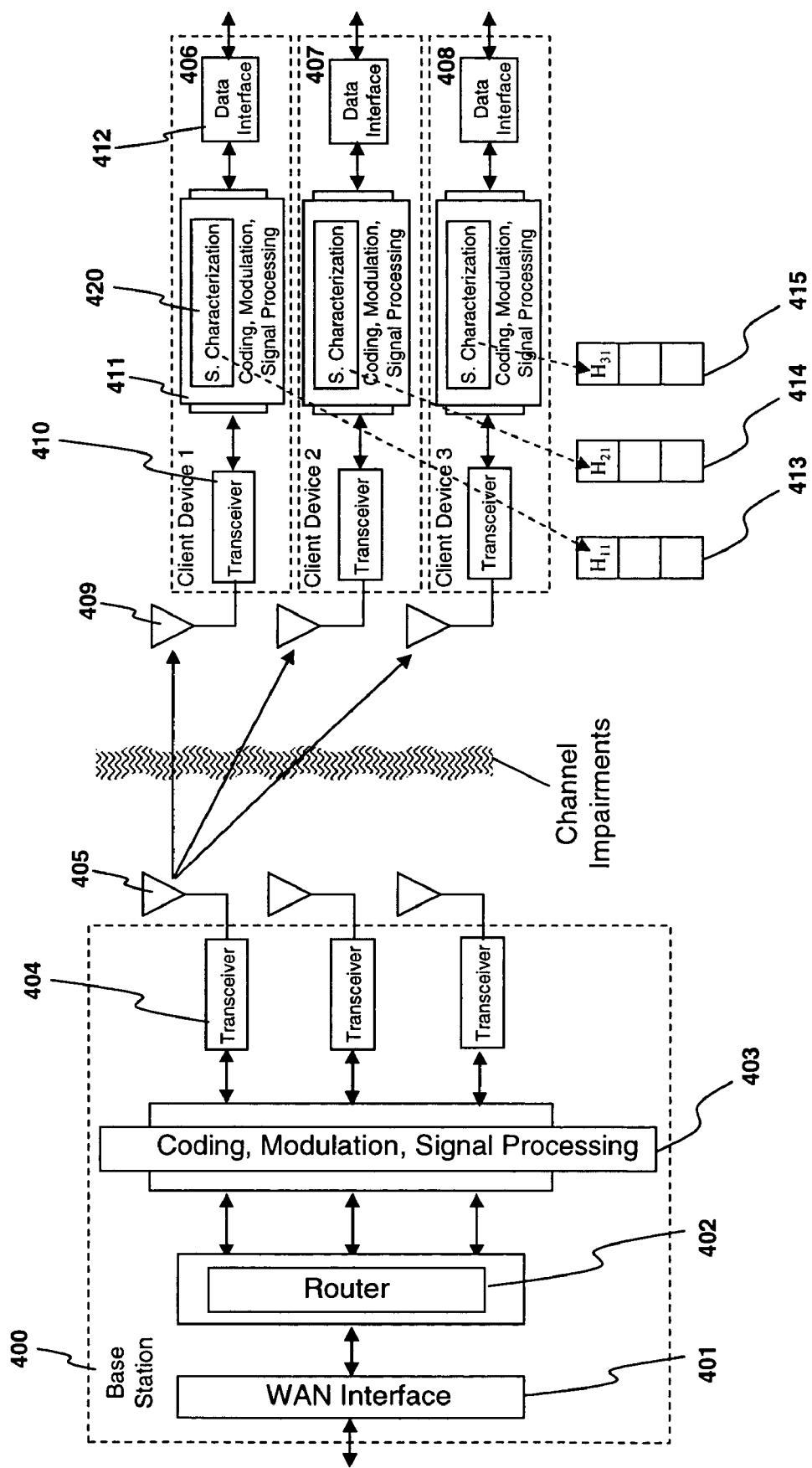
FIG. 4 illustrates training signal techniques employed in one embodiment of the invention.
Figure 5:
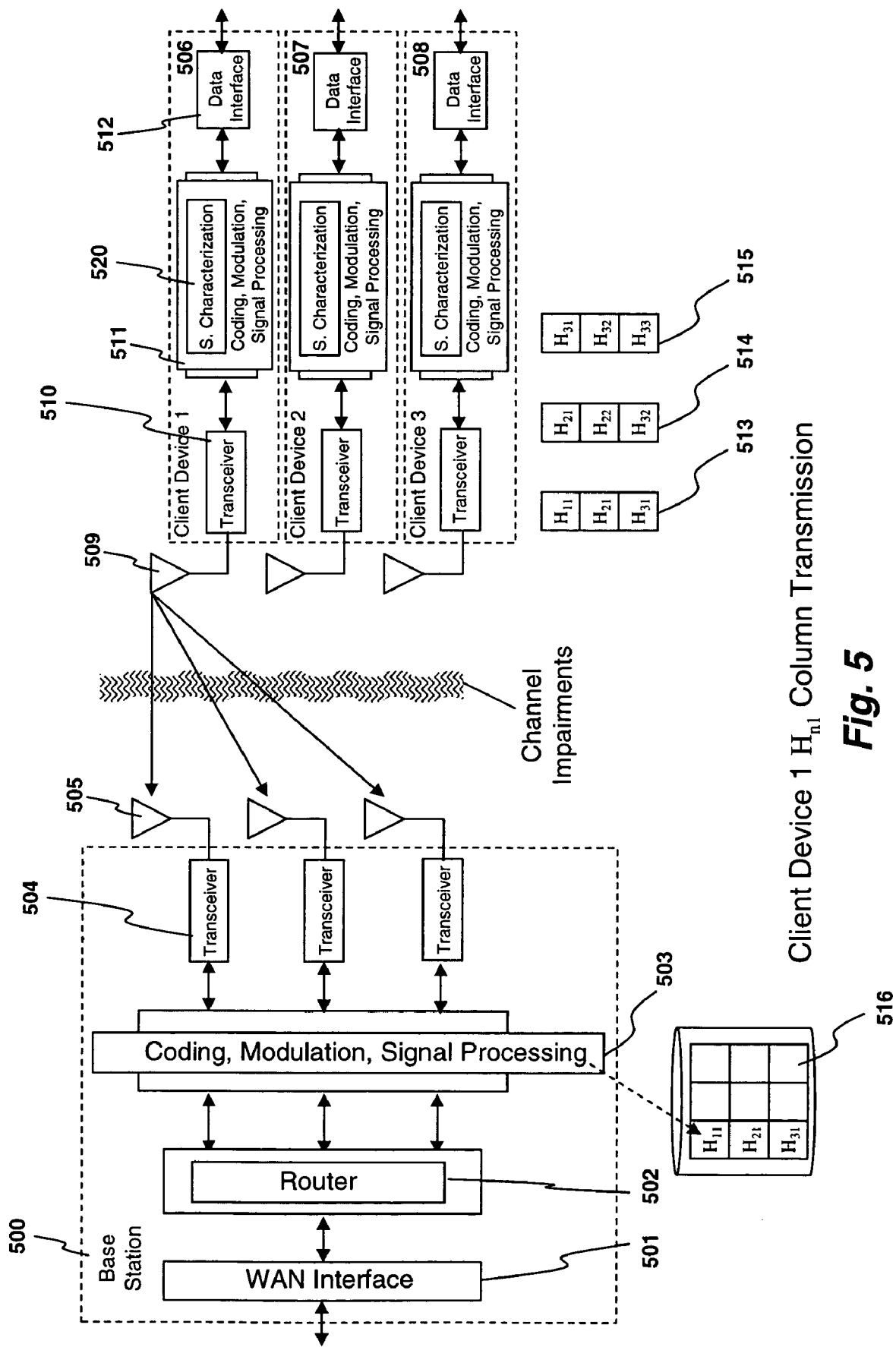
FIG. 5 illustrates channel characterization data transmitted from a client device to a base station according to one embodiment of the invention.
Figure 6:
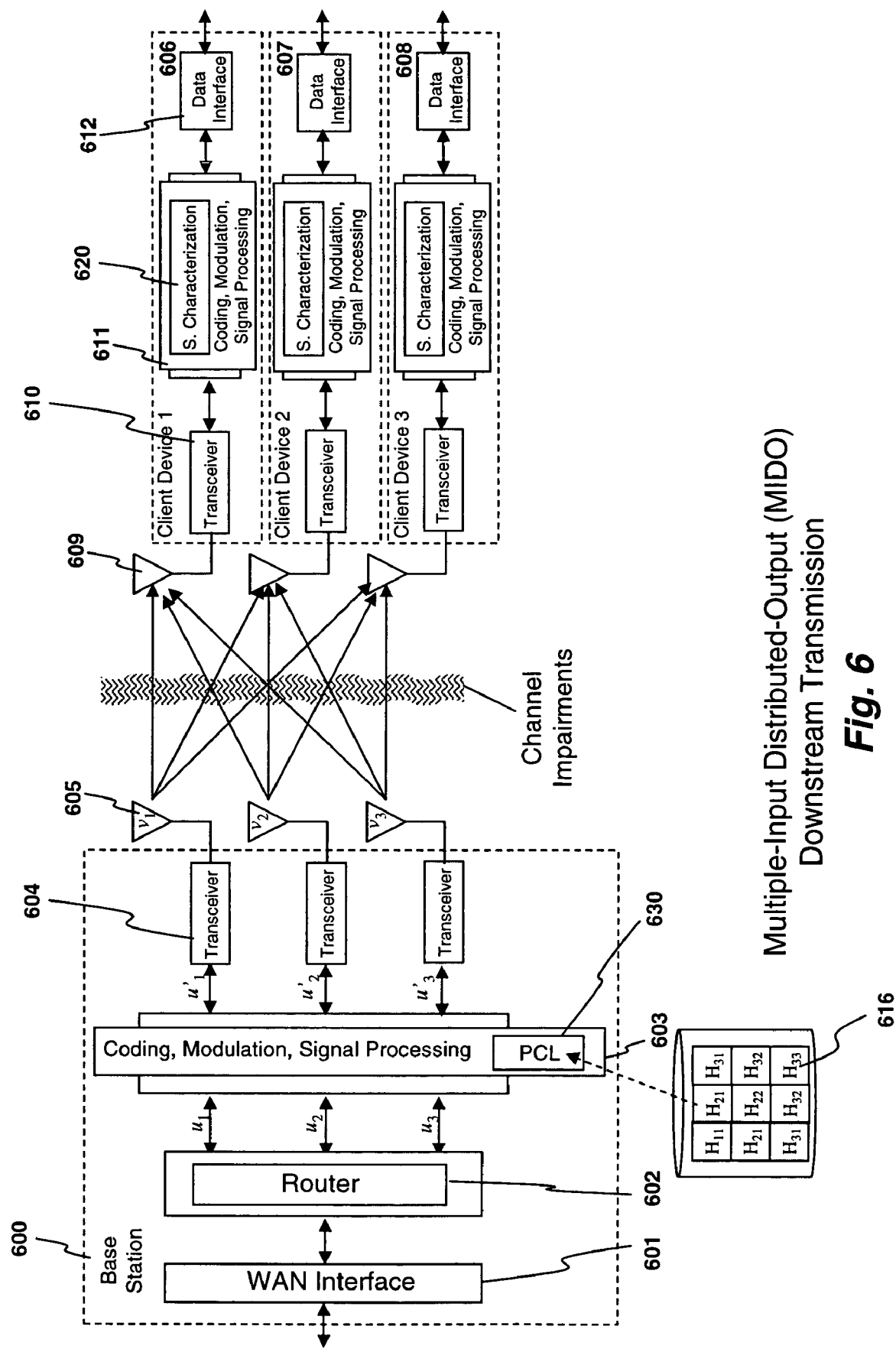
FIG. 6 illustrates a Multiple-Input Distributed-Output ("MIDO") downstream transmission according to one embodiment of the invention.

An example of how a MIDO transmission from the Base Station 300 to the Client Devices 306-308 can be accomplished is illustrated in FIGS. 4 through 6.

In one embodiment of the invention, before a MIDO transmission begins, the channel is characterized. As with a MIMO system, a training signal is transmitted (in the embodiment herein described), one-by-one, by each of the antennas 405. FIG. 4 illustrates only the first training signal transmission, but with three antennas 405 there are three separate transmissions in total. Each training signal is generated by the Coding, Modulation, and Signal Processing subsystem 403, converted to analog through a D/A converter, and transmitted as RF through each RF Transceiver 404. Various different coding, modulation and signal processing techniques may be employed including, but not limited to, those described above (e.g., Reed Solomon, Viterbi coding; QAM, DPSK, QPSK modulation, . . . etc).

Each Client Device 406-408 receives a training signal through its antenna 409 and converts the training signal to baseband by Transceiver 410. An A/D converter (not shown) converts the signal to digital where is it processed by each Coding, Modulation, and Signal Processing subsystem 411. Signal characterization logic 320 then characterizes the resulting signal (e.g., identifying phase and amplitude distortions as described above) and stores the characterization in memory. This characterization process is similar to that of prior art MIMO systems, with a notable difference being that the each client device only computes the characterization vector for its one antenna, rather than for n antennas. For example, the Coding Modulation and Signal Processing subsystem 420 of client device 406 is initialized with a known pattern of the training signal (either at the time of manufacturing, by receiving it in a transmitted message, or through another initialization process). When antenna 405 transmits the training signal with this known pattern, Coding Modulation and Signal Processing subsystem 420 uses correlation methods to find the strongest received pattern of the training signal, it stores the phase and amplitude offset, then it subtracts this pattern from the received signal. Next, it finds then second strongest received pattern that correlates to the training signal, it stores the phase and amplitude offset, then it subtracts this second strongest pattern from the received signal. This process continues until either some fixed number of phase and amplitude offsets are stored (e.g. eight), or a detectable training signal pattern drops below a given noise floor. This vector of phase/amplitude offsets becomes element $H_{11}$ of the vector 413. Simultaneously, Coding Modulation and Signal Processing subsystems for Client Devices 407 and 408 implement the same processing to produce their vector elements $H_{21}$ and $H_{31}$.

The memory in which the characterization is stored may be a non-volatile memory such as a Flash memory or a hard drive and/or a volatile memory such as a random access memory (e.g., SDRAM, RDAM). Moreover, different Client Devices may concurrently employ different types of memories to store the characterization information (e.g., PDA's may use Flash memory whereas notebook computers may use a hard drive). The underlying principles of the invention are not limited to any particular type of storage mechanism on the various Client Devices or the Base Station.

As mentioned above, depending on the scheme employed, since each Client Device 406-408 has only one antenna, each only stores a 1×3 column 413-415 of the H matrix. FIG. 4 illustrates the stage after the first training signal transmission where the first row of 1×3 columns 413-415 has been stored with channel characterization information for the first of the three Base Station antennas 405. The remaining two columns are stored following the channel characterization of the next two training signal transmissions from the remaining two base station antennas. Note that for the sake of illustration the three training signals are transmitted at separate times. If the three training signal patterns are chosen such as not to be correlated to one another, they may be transmitted simultaneously, thereby reducing training time.

As indicated in FIG. 5, after all three pilot transmissions are complete, each Client Device 506-508 transmits back to the Base Station 500 the 1×3 column 513-515 of matrix H that it has stored. To the sake of simplicity, only one Client Device 506 is illustrated transmitting its characterization information in FIG. 5. An appropriate modulation scheme (e.g. DPSK, 64QAM, OFDM) for the channel combined with adequate error correction coding (e.g. Reed Solomon, Viterbi, and/or Turbo codes) may be employed to make sure that the Base Station 500 receives the data in the columns 513-515 accurately.

Although all three antennas 505 are shown receiving the signal in FIG. 5, it is sufficient for a single antenna and transceiver of the Base Station 500 to receive each 1×3 column 513-515 transmission. However, utilizing many or all of antennas 505 and Transceivers 504 to receive each transmission (i.e., utilizing prior art Single-Input Multiple-Output ("SIMO") processing techniques in the Coding, Modulation and Signal Processing subsystem 503) may yield a better signal-to-noise ratio ("SNR") than utilizing a single antenna 505 and Transceiver 504 under certain conditions.

As the Coding, Modulation and Signal Processing subsystem 503 of Base Station 500 receives the 1×3 column 513-515, from each Client Device 507-508, it stores it in a 3×3 H matrix 516. As with the Client Devices, the Base Station may employ various different storage technologies including, but not limited to non-volatile mass storage memories (e.g., hard drives) and/or volatile memories (e.g., SDRAM) to store the matrix 516. FIG. 5 illustrates a stage at which the Base Station 500 has received and stored the 1×3 column 513 from Client Device 509. The 1×3 columns 514 and 515 may be transmitted and stored in H matrix 516 as they are received from the remaining Client Devices, until the entire H matrix 516 is stored.

One embodiment of a MIDO transmission from a Base Station 600 to Client Devices 606-608 will now be described with reference to FIG. 6. Because each Client Device 606-608 is an independent device, typically each device is receiving a different data transmission. As such, one embodiment of a Base Station 600 includes a Router 602 communicatively positioned between the WAN Interface 601 and the Coding, Modulation and Signal Processing subsystem 603 that sources multiple data streams (formatted into bit streams) from the WAN interface 601 and routes them as separate bit streams $u_1$-$u_3$ intended for each Client Device 606-608, respectively. Various well known routing techniques may be employed by the router 602 for this purpose.

The three bit streams, $u_1$-$u_3$, shown in FIG. 6 are then routed into the Coding, Modulation and Signal Processing subsystem 603 and coded into statistically distinct, error correcting streams (e.g. using Reed Solomon, Viterbi, or Turbo Codes) and modulated using an appropriate modulation scheme for the channel (such as DPSK, 64QAM or OFDM). In addition, the embodiment illustrated in FIG. 6 includes signal precoding logic 630 for uniquely coding the signals transmitted from each of the antennas 605 based on the signal characterization matrix 616. More specifically, rather than routing each of the three coded and modulated bit streams to a separate antenna (as is done in FIG. 1), in one embodiment, the preceding logic 630 multiplies the three bit streams $u_1$-$u_3$ in FIG. 6 by the inverse of the H matrix 616, producing three new bit streams, $u'_1$-$u'_3$. The three precoded bit streams are then converted to analog by D/A converters (not shown) and transmitted as RF by Transceivers 604 and antennas 605.

Before explaining how the bit streams are received by the Client Devices 606-608, the operations performed by the precoding module 630 will be described. Similar to the MIMO example from FIG. 1 above, the coded and modulated signal for each of the three source bit streams will be designated with $u_n$. In the embodiment illustrated in FIG. 6, each $u_i$ contains the data from one of the three bit streams routed by the Router 602, and each such bit stream is intended for one of the three Client Devices 606-608.

However, unlike the MIMO example of FIG. 1, where each $x_i$ is transmitted by each antenna 104, in the embodiment of the invention illustrated in FIG. 6, each $u_i$ is received at each Client Device antenna 609 (plus whatever noise N there is in the channel). To achieve this result, the output of each of the three antennas 605 (each of which we will designate as $v_i$) is a function of $u_i$ and the H matrix that characterizes the channel for each Client Device. In one embodiment, each $v_i$ is calculated by the precoding logic 630 within the Coding, Modulation and Signal Processing subsystem 603 by implementing the following formulas:

$$v_1 = u_1 H^{-1}{}_{11} + u_2 H^{-1}{}_{12} + u_3 H^{-1}{}_{13} v_2 = u_1 H^{-1}{}_{21} + u_2 H^{-1}{}_{22} u_3 H^{-1}{}_{23}$$

$$v_3 = u_1 H^{-1}{}_{31} + u_2 H^{-1}{}_{32} + u_3 H^{-1}{}_{33}$$

Thus, unlike MIMO, where each $x_i$ is calculated at the receiver after the signals have been transformed by the channel, the embodiments of the invention described herein solve for each $v_i$ at the transmitter before the signals have been transformed by the channel. Each antenna 609 receives $u_i$ already separated from the other $u_{n-1}$ bit streams intended for the other antennas 609. Each Transceiver 610 converts each received signal to baseband, where it is digitized by an A/D converter (now shown), and each Coding, Modulation and Signal Processing subsystem 611, demodulates and decodes the $x_i$ bit stream intended for it, and sends its bit stream to a Data Interface 612 to be used by the Client Device (e.g., by an application on the client device).

The embodiments of the invention described herein may be implemented using a variety of different coding and modulation schemes. For example, in an OFDM implementation, where the frequency spectrum is separated into a plurality of sub-bands, the techniques described herein may be employed to characterize each individual sub-band. As mentioned above, however, the underlying principles of the invention are not limited to any particular modulation scheme.

If the Client Devices 606-608 are portable data processing devices such as PDAs, notebook computers, and/or wireless telephones the channel characterization may change frequently as the Client Devices may move from one location to another. As such, in one embodiment of the invention, the channel characterization matrix 616 at the Base Station is continually updated. In one embodiment, the Base Station 600 periodically (e.g., every 250 milliseconds) sends out a new training signal to each Client Device, and each Client Device continually transmits its channel characterization vector back to the Base Station 600 to ensure that the channel characterization remains accurate (e.g. if the environment changes so as to affect the channel or if a Client Device moves). In one embodiment, the training signal is interleaved within the actual data signal sent to each client device. Typically, the training signals are much lower bandwidth than the data signals, so this would have little impact on the overall throughput of the system. Accordingly, in this embodiment, the channel characterization matrix 616 may be updated continuously as the Base Station actively communicates with each Client Device, thereby maintaining an accurate channel characterization as the Client Devices move from one location to the next or if the environment changes so as to affect the channel.

Figure 7:
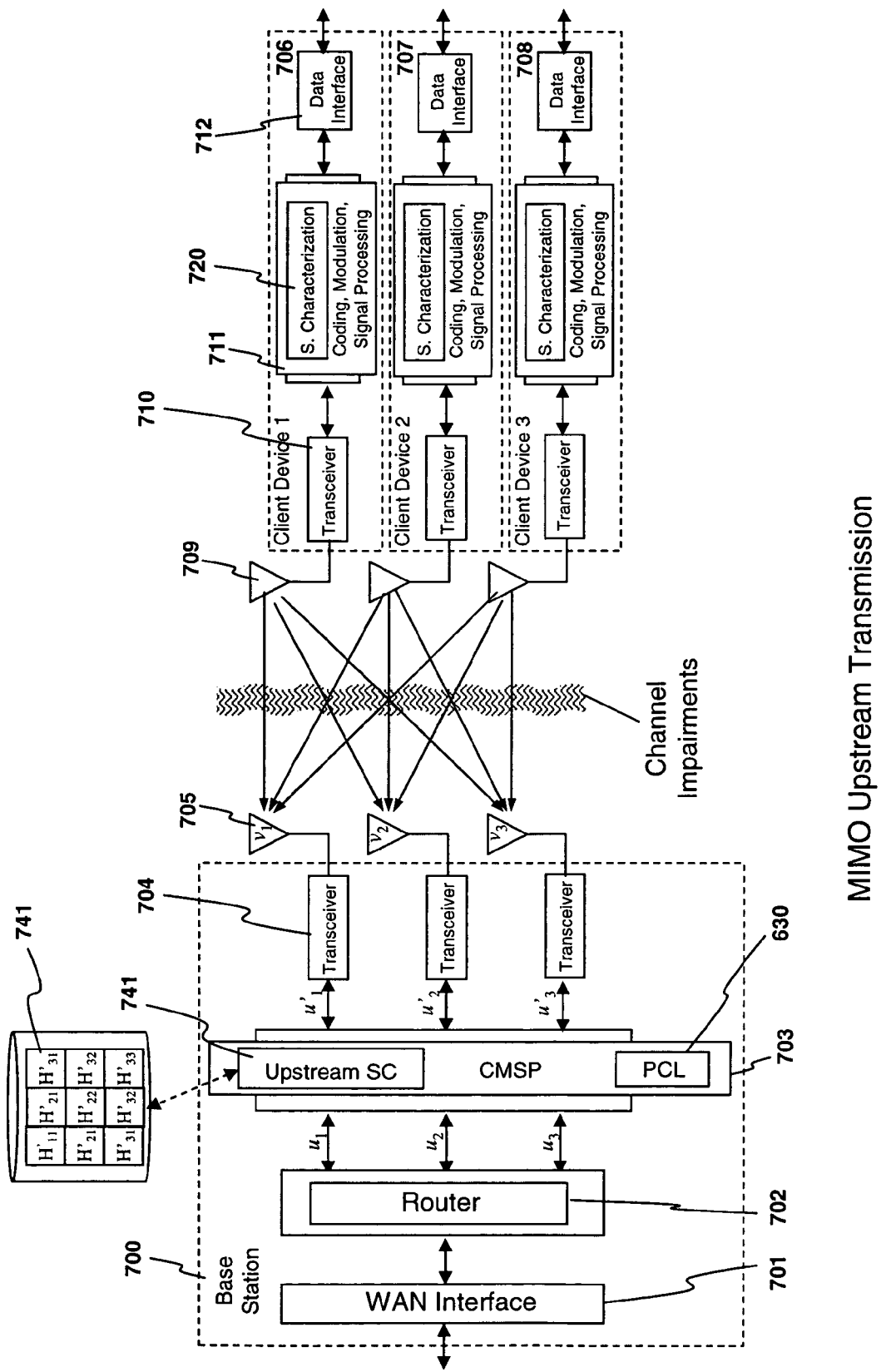
FIG. 7 illustrates a Multiple-Input Multiple Output ("MIMO") upstream transmission according to one embodiment of the invention.

One embodiment of the invention illustrated in FIG. 7 employs MIMO techniques to improve the upstream communication channel (i.e., the channel from the Client Devices 706-708 to the Base Station 700). In this embodiment, the channel from each of the Client Devices is continually analyzed and characterized by upstream channel characterization logic 741 within the Base Station. More specifically, each of the Client Devices 706-708 transmits a training signal to the Base Station 700 which the channel characterization logic 741 analyzes (e.g., as in a typical MIMO system) to generate an N×M channel characterization matrix 741, where N is the number of Client Devices and M is the number of antennas employed by the Base Station. The embodiment illustrated in FIG. 7 employs three antennas 705 at the Base Station and three Client Devices 706-608, resulting in a 3×3 channel characterization matrix 741 stored at the Base Station 700. The MIMO upstream transmission illustrated in FIG. 7 may be used by the Client Devices both for transmitting data back to the Base Station 700, and for transmitting channel characterization vectors back to the Base Station 700 as illustrated in FIG. 5. But unlike the embodiment illustrated in FIG. 5 in which each Client Device's channel characterization vector is transmitted at a separate time, the method shown in FIG. 7 allows for the simultaneous transmission of channel characterization vectors from multiple Client Devices back to the Base Station 700, thereby dramatically reducing the channel characterization vectors' impact on return channel throughput.

As mentioned above, each signal's characterization may include many factors including, for example, phase and amplitude relative to a reference internal to the receiver, an absolute reference, a relative reference, characteristic noise, or other factors. For example, in a quadrature amplitude modulation ("QAM")-modulated signal the characterization might be a vector of the phase and amplitude offsets of several multipath images of the signal. As another example, in an orthogonal frequency division multiplexing ("OFDM")-modulated signal, it might be a vector of the phase and amplitude offsets of several or all of the individual sub-signals in the OFDM spectrum. The training signal may be generated by each Client Device's coding and modulation subsystem 711, converted to analog by a D/A converter (not shown), and then converted from baseband to RF by each Client Device's transmitter 709. In one embodiment, in order to ensure that the training signals are synchronized, Client Devices only transmit training signals when requested by the Base Station (e.g., in a round robin manner). In addition, training signals may be interleaved within or transmitted concurrently with the actual data signal sent from each client device. Thus, even if the Client Devices 706-708 are mobile, the training signals may be continuously transmitted and analyzed by the upstream channel characterization logic 741, thereby ensuring that the channel characterization matrix 741 remains up-to-date.

The total channel bandwidth supported by the foregoing embodiments of the invention may be defined as min (N, M) where N is the number of Client Devices and M is the number of Base Station antennas. That is, the capacity is limited by the number of antennas on either the Base Station side or the Client side. As such, one embodiment of the invention employs synchronization techniques to ensure that no more than min (N, M) antennas are transmitting/receiving at a given time.

Figure 8:
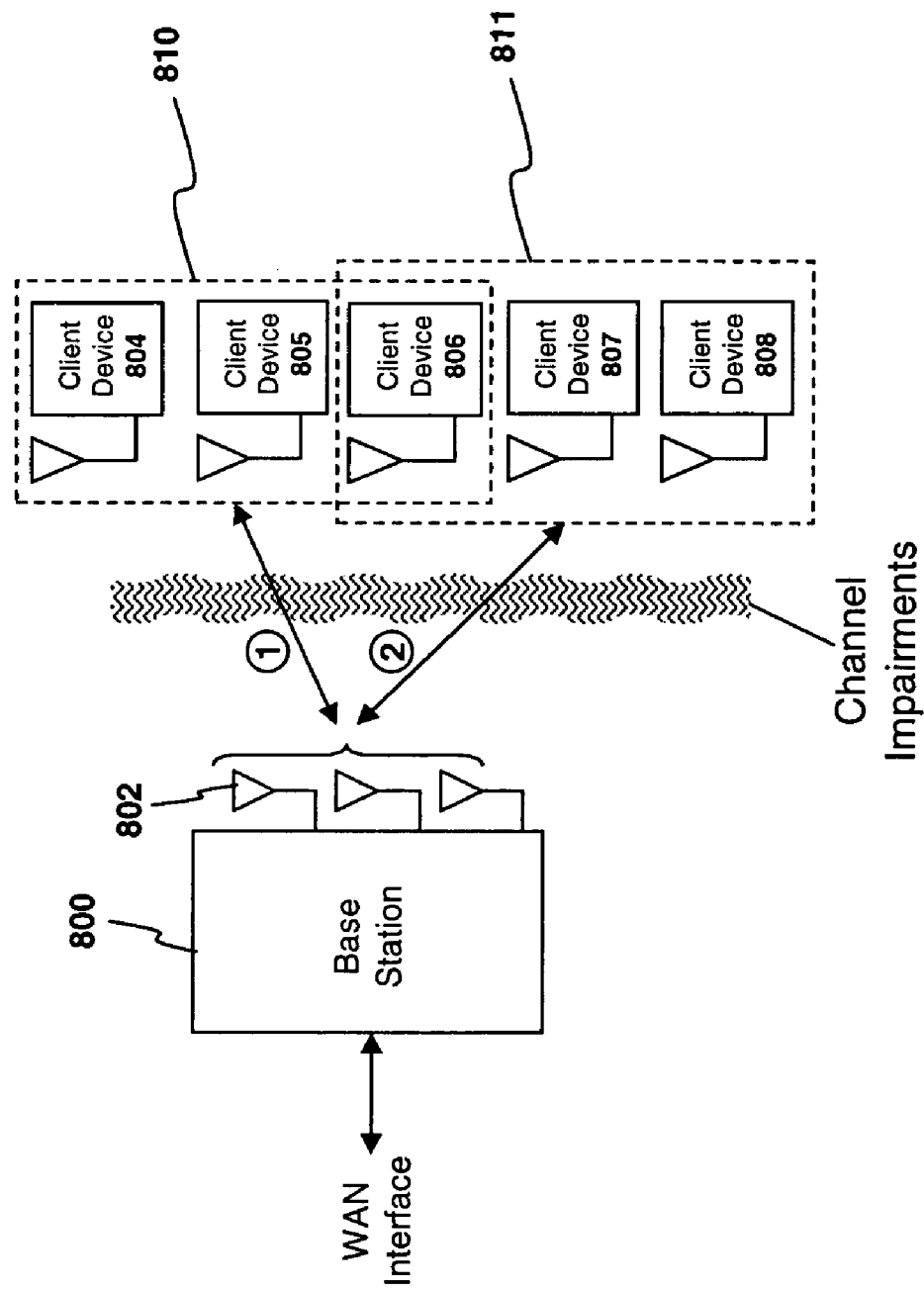
FIG. 8 illustrates a base station cycling through different client groups to allocate bandwidth according to one embodiment of the invention.

In a typical scenario, the number of antennas 705 on the Base Station 700 will be less than the number of Client Devices 706-708. An exemplary scenario is illustrated in FIG. 8 which shows five Client Devices 804-808 communicating with a base station having three antennas 802. In this embodiment, after determining the total number of Client Devices 804-808, and collecting the necessary channel characterization information (e.g., as described above), the Base Station 800 chooses a first group of three clients 810 with which to communicate (three clients in the example because min (N, M)=3). After communicating with the first group of clients 810 for a designated period of time, the Base Station then selects another group of three clients 811 with which to communicate. To distribute the communication channel evenly, the Base Station 800 selects the two Client Devices 807, 808 which were not included in the first group. In addition, because an extra antenna is available, the Base Station 800 selects an additional client device 806 included in the first group. In one embodiment, the Base Station 800 cycles between groups of clients in this manner such that each client is effectively allocated the same amount of bandwidth over time. For example, to allocate bandwidth evenly, the Base Station may subsequently select any combination of three Client Devices which excludes Client Device 806 (i.e., because Client Device 806 was engaged in communication with the Base Station for the first two cycles).

In one embodiment, in addition to standard data communications, the Base Station may employ the foregoing techniques to transmit training signals to each of the Client Devices and receive training signals and signal characterization data from each of the Client Devices.

In one embodiment, certain Client Devices or groups of client devices may be allocated different levels of bandwidth. For example, Client Devices may be prioritized such that relatively higher priority Client Devices may be guaranteed more communication cycles (i.e., more bandwidth) than relatively lower priority client devices. The "priority" of a Client Device may be selected based on a number of variables including, for example, the designated level of a user's subscription to the wireless service (e.g., user's may be willing to pay more for additional bandwidth) and/or the type of data being communicated to/from the Client Device (e.g., real-time communication such as telephony audio and video may take priority over non-real time communication such as email).

In one embodiment of the Base Station dynamically allocates bandwidth based on the Current Load required by each Client Device. For example, if Client Device 804 is streaming live video and the other devices 805-808 are performing non-real time functions such as email, then the Base Station 800 may allocate relatively more bandwidth to this client 804. It should be noted, however, that the underlying principles of the invention are not limited to any particular bandwidth allocation technique.

Figure 9:
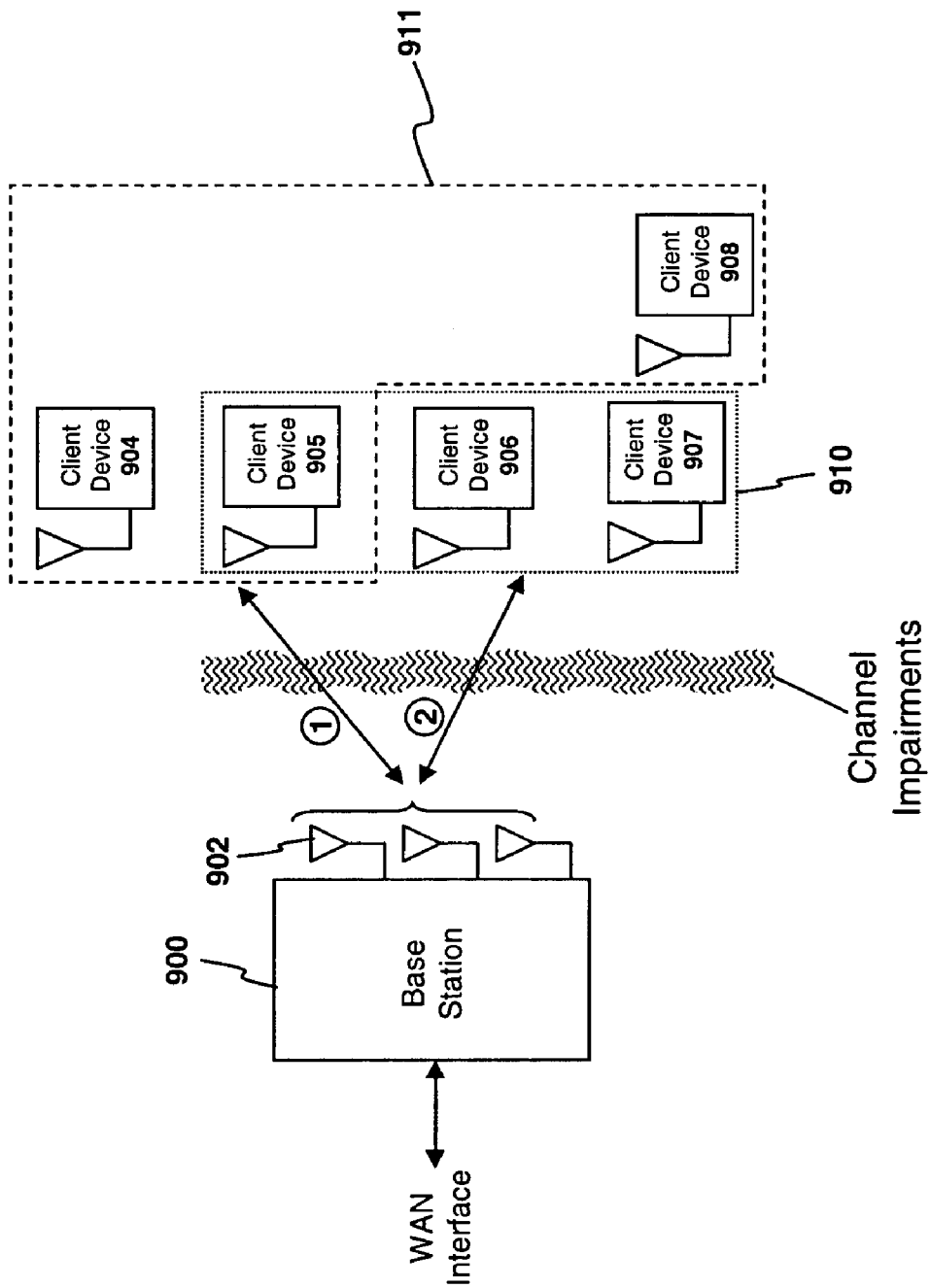
FIG. 9 illustrates a grouping of clients based on proximity according to one embodiment of the invention.

As illustrated in FIG. 9, two Client Devices 907, 908 may be so close in proximity, that the channel characterization for the clients is effectively the same. As a result, the Base Station will receive and store effectively equivalent channel characterization vectors for the two Client Devices 907, 908 and therefore will not be able to create unique, spatially distributed signals for each Client Device. Accordingly, in one embodiment, the Base Station will ensure that any two or more Client Devices which are in close proximity to one another are allocated to different groups. In FIG. 9, for example, the Base Station 900 first communicates with a first group 910 of Client Devices 904, 905 and 908; and then with a second group 911 of Client Devices 905, 906, 907, ensuring that Client Devices 907 and 908 are in different groups.

Alternatively, in one embodiment, the Base Station 900 communicates with both Client Devices 907 and 908 concurrently, but multiplexes the communication channel using known channel multiplexing techniques. For example, the Base Station may employ time division multiplexing ("TDM"), frequency division multiplexing ("FDM") or code division multiple access ("CDMA") techniques to divide the single, spatially-correlated signal between Client Devices 907 and 908.

Although each Client Device described above is equipped with a single antenna, the underlying principles of the invention may be employed using Client Devices with multiple antennas to increase throughput. For example, when used on the wireless systems described above, a client with 2 antennas will realize a 2× increase in throughput, a client with 3 antennas will realize a 3× increase in throughput, and so on (i.e., assuming that the spatial and angular separation between the antennas is sufficient). The Base Station may apply the same general rules when cycling through Client Devices with multiple antennas. For example, it may treat each antenna as a separate client and allocate bandwidth to that "client" as it would any other client (e.g., ensuring that each client is provided with an adequate or equivalent period of communication).

Figure 10:
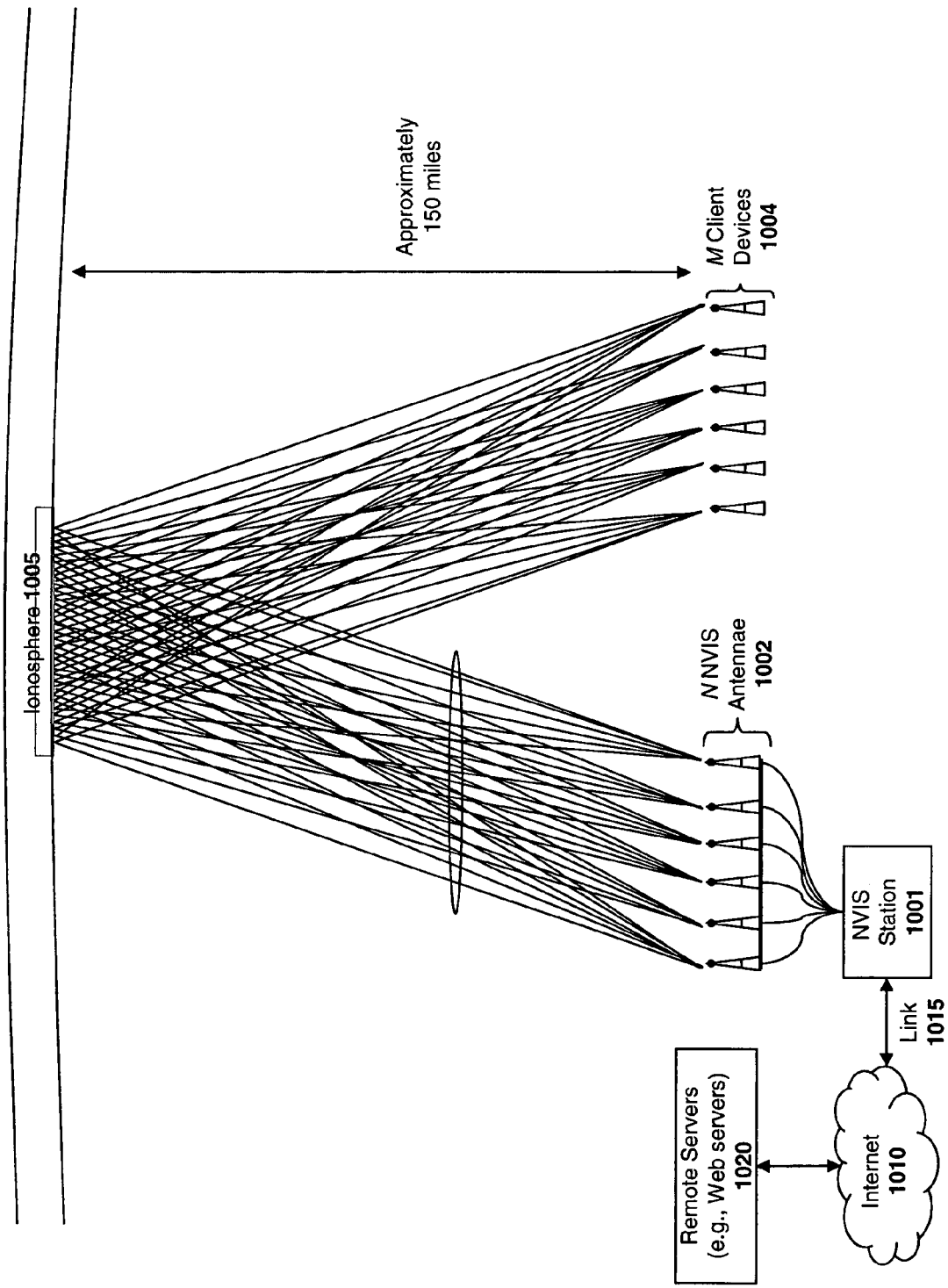
FIG. 10 illustrates an embodiment of the invention employed within an NVIS system.

As mentioned above, one embodiment of the invention employs the MIDO and/or MIMO signal transmission techniques described above to increase the signal-to-noise ratio and transmission bandwidth within a Near Vertical Incidence Skywave ("NVIS") system. Referring to FIG. 10, in one embodiment of the invention, a first NVIS station 1001 equipped with a matrix of N antennas 1002 is configured to communicate with M client devices 1004. The NVIS antennas 1002 and antennas of the various client devices 1004 transmit signals upward to within about 15 degrees of vertical in order to achieve the desired NVIS and minimize ground wave interference effects. In one embodiment, the antennas 1002 and client devices 1004, support multiple independent data streams 1006 using the various MIDO and MIMO techniques described above at a designated frequency within the NVIS spectrum (e.g., at a carrier frequency at or below 23 MHz, but typically below 10 MHz), thereby significantly increasing the bandwidth at the designated frequency (i.e., by a factor proportional to the number of statistically independent data streams).

The NVIS antennas serving a given station may be physically very far apart from each other. Given the long wavelengths below 10 MHz and the long distance traveled for the signals (as much as 300 miles round trip), physical separation of the antennas by 100s of yards, and even miles, can provide advantages in diversity. In such situations, the individual antenna signals may be brought back to a centralized location to be processed using conventional wired or wireless communications systems. Alternatively, each antenna can have a local facility to process its signals, then use conventional wired or wireless communications systems to communicate the data back to a centralized location. In one embodiment of the invention, NVIS Station 1001 has a broadband link 1015 to the Internet 1010 (or other wide area network), thereby providing the client devices 1003 with remote, high speed, wireless network access.

Figure 11:
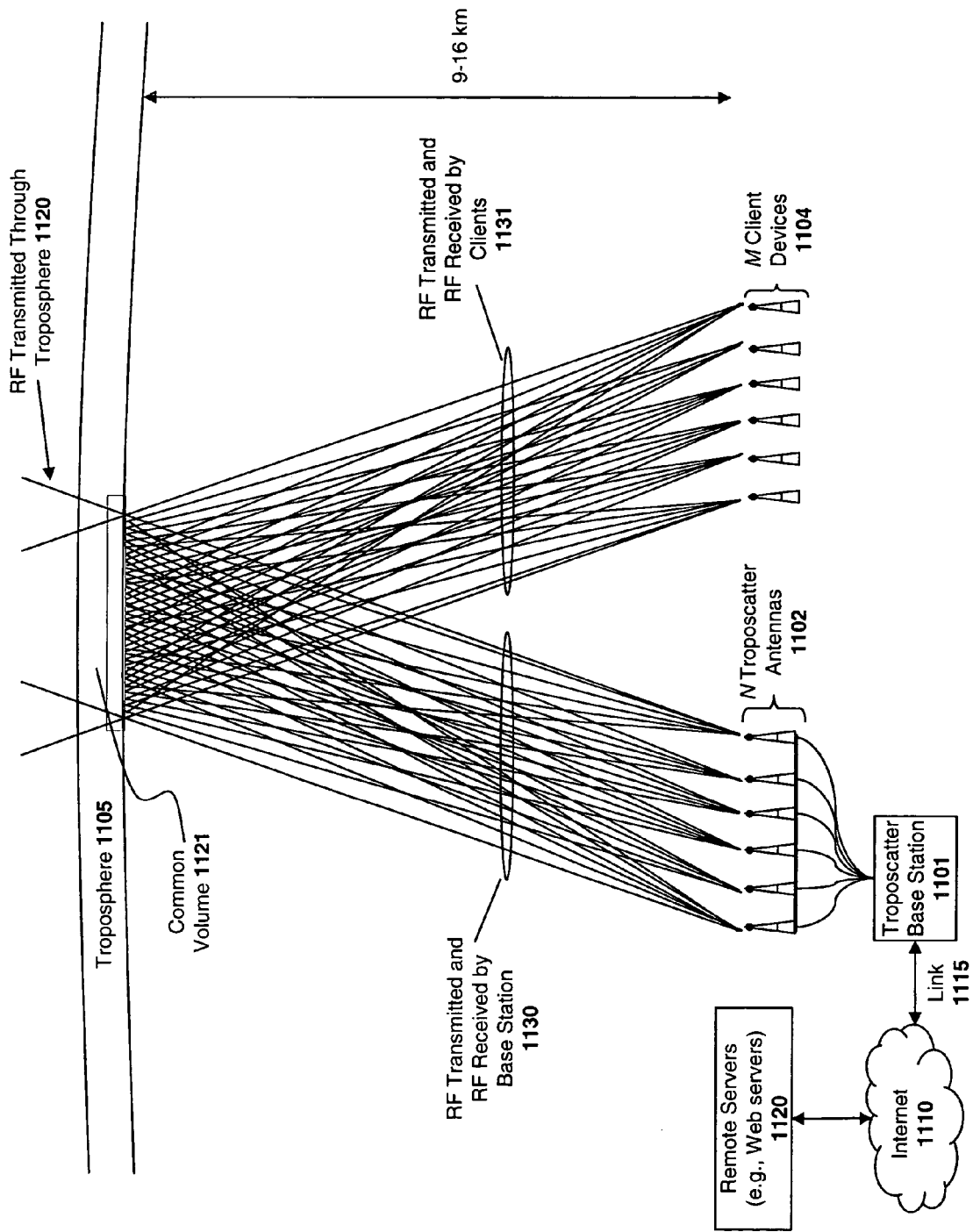
FIG. 11 illustrates an embodiment of the invention employing the use of tropospheric scatter.
Figure 12:
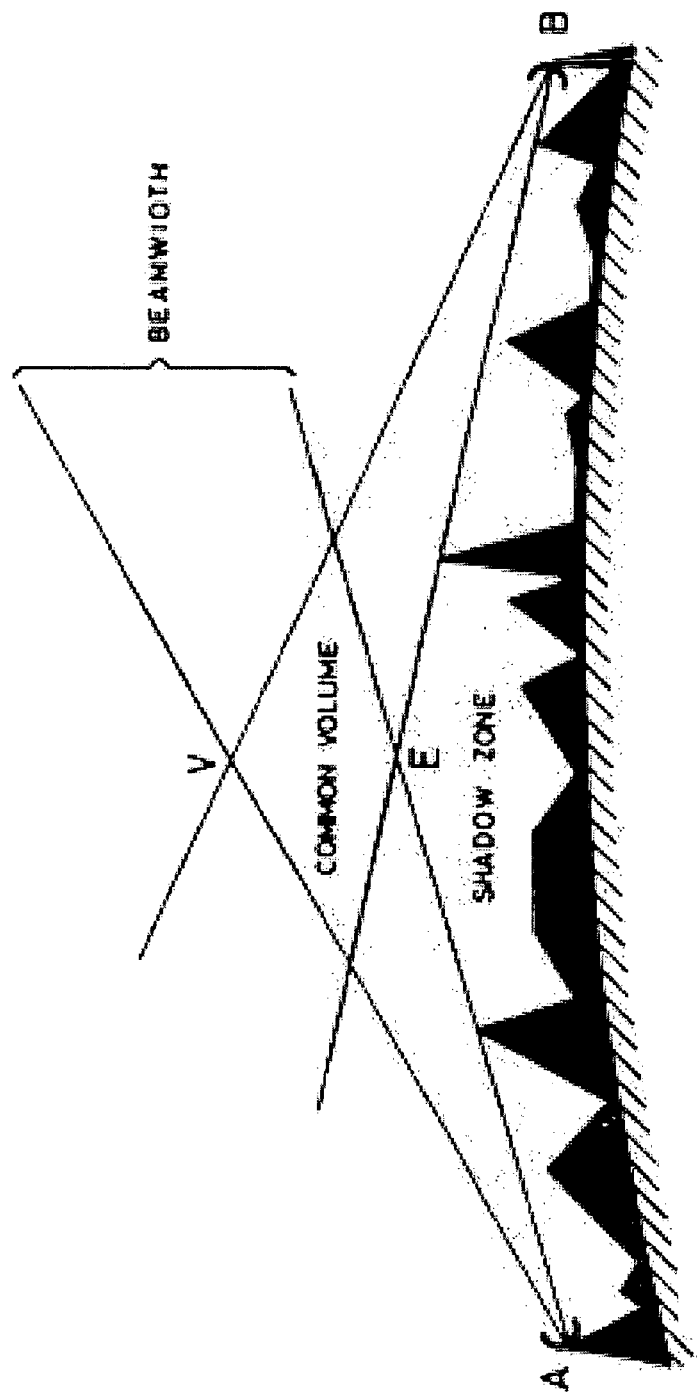
FIG. 12 illustrates a prior art tropospheric scatter transmission system.

As mentioned above, one embodiment of the invention employs the MIDO and/or MIMO signal transmission techniques described above (collective referred to heretofore as "DIDO") to increase the signal-to-noise ratio and transmission bandwidth within a tropospheric scatter ("troposcatter") system. Referring to FIG. 11, in one embodiment of the invention, a first troposcatter station 1101 equipped with a matrix of N antennas 1102 is configured to communicate with M client devices 1104. (The upward angle of transmission is exaggerated for illustration purposes in FIG. 11. A more typical low angle for troposcatter transmission is shown in prior art FIG. 12.) The antennas of the various client devices 1104 transmit signals back through tropospheric scatter, and they are received by base station antennas 1102.

The troposcatter base station antennas 1102 are aimed at an upward angle so that part of the transmission scatters and reflects off the troposphere so as to hit the target area where the M client devices 1104 are located. Calculating specific antenna elevation angles and optimizing antennas for troposcatter is well understood to those skilled in the art, and several online calculators exist for making such calculations. As an example, one such calculator can be downloaded at http://home.planet.nl/~alphe078/propagat1.htm. This particular troposcatter calculator's input parameters include distance between the transmit and receive antennas, transmission frequency, antenna heights, output power, station noise characteristics, obstacle distance/heights, antenna gain, and bandwidth.

An exemplary prior art troposcatter radio terminal (i.e. transceiver and antenna) that is currently in use by the US Military is the AN/TRC-170V3 Tropospheric Microwave Radio Terminal. The system has a nominal transmission range of 100 miles. Such a system typically transmits less than 1 Mbps. Newer troposcatter modems such as the General Dynamics and Radyne Corporation TM-20 modem can achieve up to 20 Mbps. But, both systems only can achieve such data rates with a single data stream in a given channel, In one embodiment, the antennas 1102 and client devices 1104, support multiple independent data streams 1106 using the various DIDO techniques described herein at a designated frequency within the troposcatter spectrum (e.g., at a carrier frequency from below 50 MHz to above 10 GHz). These DIDO techniques include, but are not limited to, the transmission of training signals, the characterization of the channel vectors, and the transmission back to the troposcatter base station 1101 of the channel vectors so as to form a channel matrix.

The troposcatter antennas served by a given troposcatter base station 1101 may be close (e.g. as close as λ/6) or physically very far apart (10s or 100s of miles) from each other and/or they may be clustered in groups. So, the term "troposcatter base station 1101" as used herein refers to a common channel matrix computation system, similar to FIG. 2's Base Station 200, but one in which the transmitting antennas 1102 may in fact be distributed very far from a given site. The specific configuration will depend on the desired coverage area, the need to avoid obstacles in the terrain, and if necessary, the need to achieve more diversity and/or a wider angle between transmit antennas. As previously described, a DIDO base station, by utilizing channel state information feedback from the client devices after sending training signals, will produce a combination of transmitted signals from its antennas 1102, such that the client devices will receive independent signals. And, when the client devices 1104 transmit back to the base stations antennas 1102, the base station will use the channel state information determined from client device training signals.

Because troposcatter largely preserves polarization, 2D and 3D polarization can be used with antennas 1102 and 1104 to achieve further diversity.

In one embodiment of the invention, troposcatter Station 1101 has a broadband link 1115 to the Internet 1110 (or other wide area network), thereby providing the client devices 1103 with remote, high speed, wireless network access.

The troposcatter base station antennas 1102 and the client device antennas 1104 will work best if they each have a line-of-sight (LOS) view of the troposphere to the common volume 1121. The common volume 1121 is an area of the troposphere where tropospheric scattering will cause some of the transmitted signal to reflect back to the ground. Typically, most of the transmitted signal will pass through the troposphere as indicated by 1120. Perfect LOS transmissions over long distances with very narrow angles between antennas may result in poor diversity. This can be mitigated by separating the base station antennas 1102 by large distances, but the scattering effect of the troposphere itself may also create diversity.

While a LOS path to the common volume 1121 can be planned for when the base station antennas 1102 are installed, it is more difficult to guarantee that a client device antenna 1104 has a LOS view of the common volume 1121. In particular, the common volume 1121 is often going to be at a low angle in the sky. If, for example, a consumer wishes to place a client device antenna 1104 in a window of her house, or on the roof of her house, even though the antenna may have a view of some of the sky, it may be obstructed from having a view of the particular patch of the sky which contains the common volume 1121.

Figure 13:
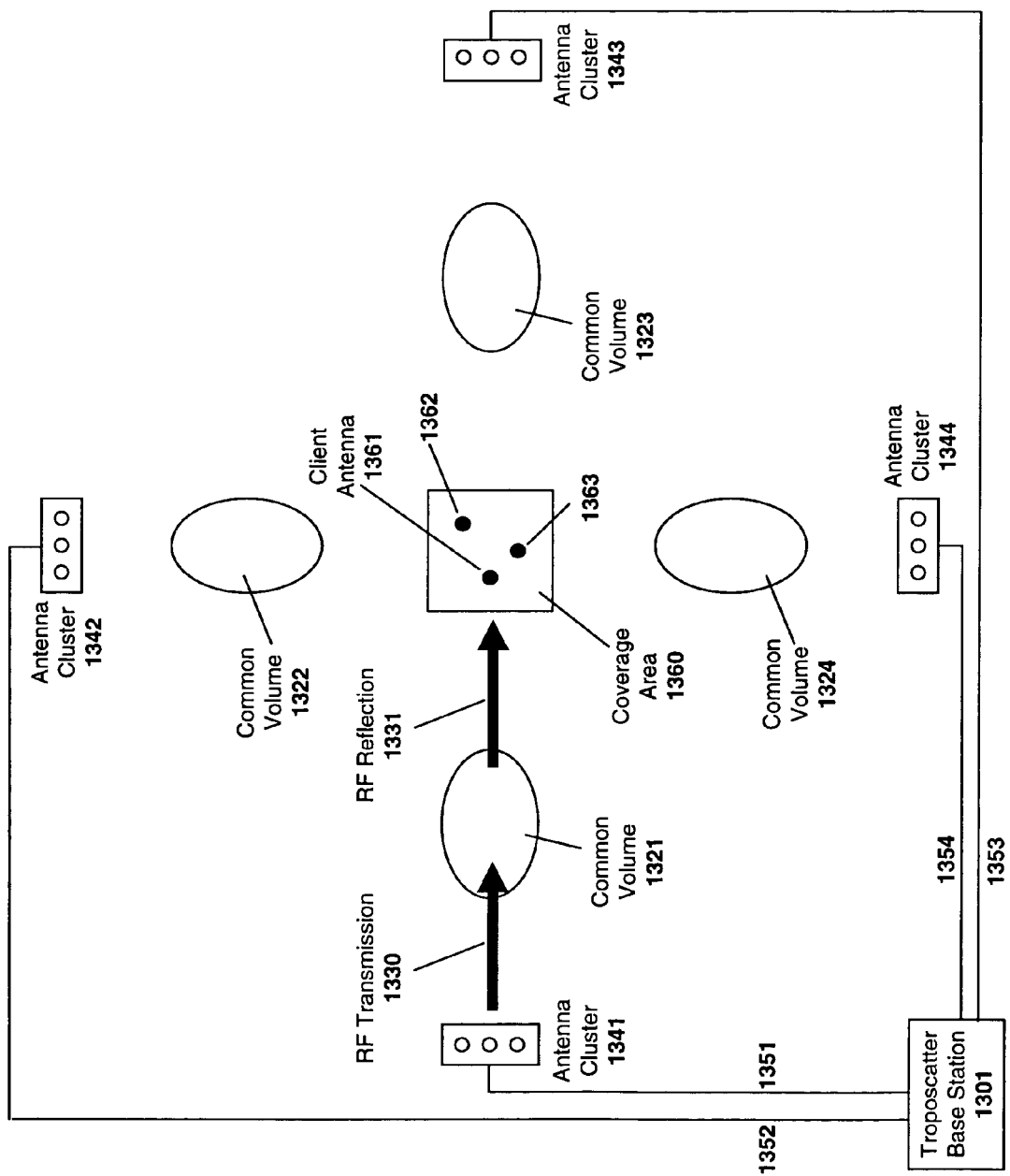
FIG. 13 illustrates an embodiment of the invention employing the use of a tropospheric scatter transmission system over a coverage area.

This issue can be mitigated by having multiple troposcatter base station antennas 1102 transmitting from various directions over a coverage area. One such configuration is illustrated in FIG. 13 from an overhead ("plan") view. Troposcatter base station 1301 serves the same function as troposcatter base station 1101, but its antennas are deliberately distributed far apart in antenna clusters 1341-1344. The antenna clusters 1341-1344 are aimed such that their transmissions reflect from the troposphere to a common ground coverage area 1360. This coverage area may be a town, a city, a rural area, or an uninhabited area under exploration. It may also be an area on a body of water. Antenna cluster 1341 transmits RF transmission 1330, which scatters in common volume 1321 and then reflects back to earth as RF reflection 1331 into coverage area 1360 where it then is received in coverage area 1360 by one or more client antennas 1361-1363. Simultaneously, antenna clusters 1342-1344 transmit RF that scatters in common volumes 1322-1324, respectively, and then the RF reflects back to earth in to coverage area 1360 where it is then received by one or more client antennas 1361-1363. And, one or more client antennas 1361-1363 transmit back through common volumes 1321-1324 to antenna clusters 1341-1344 as a return path.

Some or all client antennas 1361-1363 may not have a LOS view the sky to see all common volumes 1321-1324. But so long as each client antenna 1361-1363 can see at least one common volume 1321-1324, then it will be able to have communications with the troposcatter base station 1301. Clearly, the more antenna clusters 1341-1344 that are established around the coverage area 1360, the less chance that a client antenna 1361 will be unable to see at least one common volume 1321-1324.

The troposcatter base station 1101 communicates to the antenna clusters 1341-1344 through communication links 1351-1354. These communications links 1351-1354 may be physically implemented via various means, including optical fiber, leased communications lines, such as DS3 lines, or they may be implemented through wireless communications. In fact, communication links 1351-1354 may be implemented utilizing troposcatter communications.

Because of the long distances required for the communications links 1351-1354, in the presently preferred embodiment, each of the antenna clusters 1341-1344 will have its own local RF transceivers which are directed by the troposcatter base 1301 as to precisely what RF signals are to be generated in synchrony so that all antenna clusters 1341-1344 work in a coordinated fashion as a single DIDO system.

In an alternative embodiment, each antenna cluster 1341-1344 will have its own base station 1301 and will operate independently from the other antenna clusters 1341-1344. In this situation each antenna cluster may transmit at a different frequency so as to avoid interfering with the others, or directional antennas maybe used for client antennas 1361-1363 may so as to reject transmission from all but a signal antenna cluster 1341-1344.

An alternative embodiment of the system illustrated in FIG. 13 is illustrated in FIGS. 16 and FIGS. 17a-c. The communications links, then base station and the common volumes from FIG. 13 are not shown in FIG. 16 and FIGS. 17a-c for the sake of clarity, but such components still exist, and are implemented as previously described.

Figure 16:
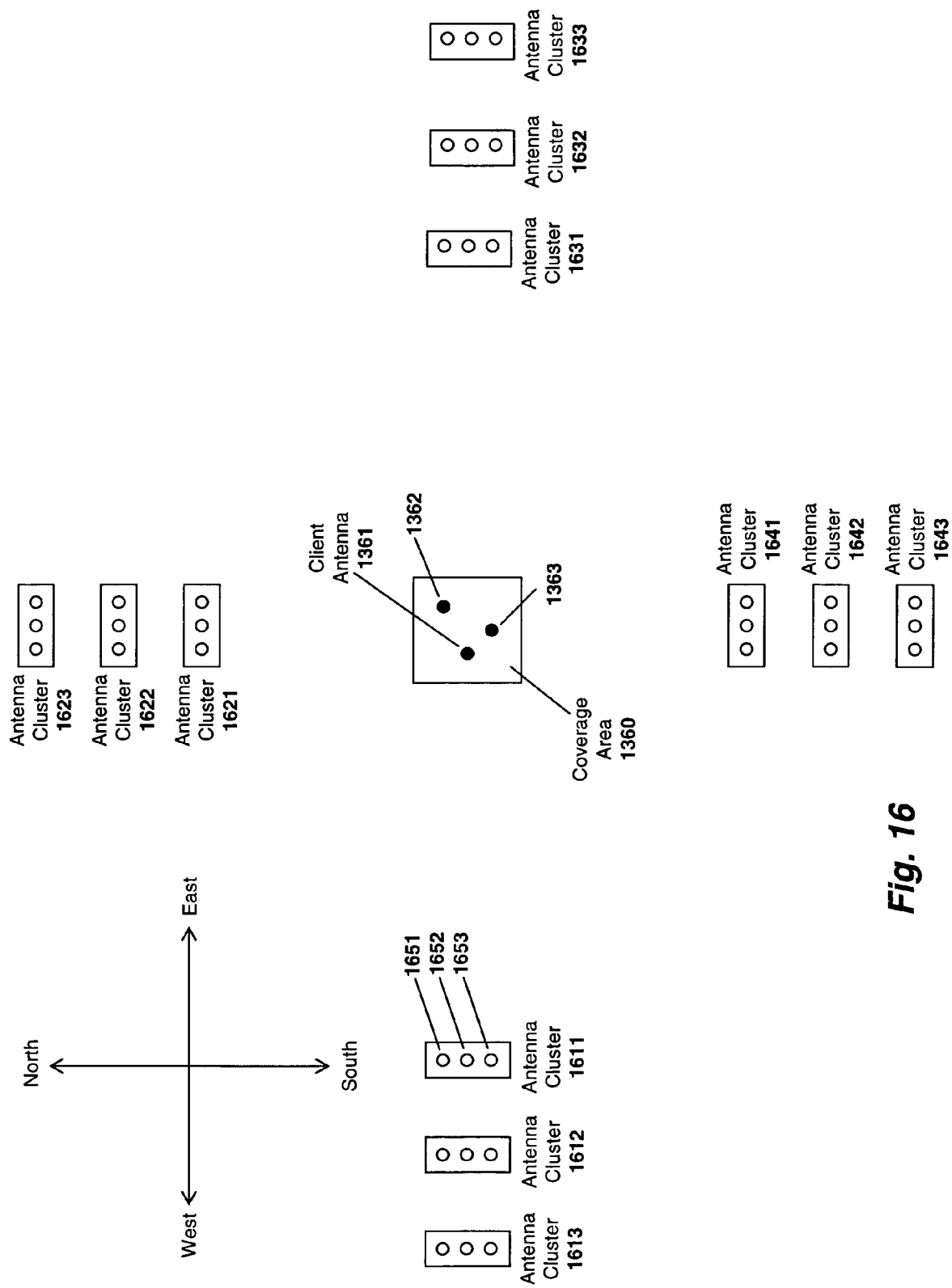
FIG. 16 illustrates an overhead view of a coverage area surrounded by 12 clusters of 3 antennas.

FIG. 16 shows an overhead (plan) view of a coverage area 1360 surrounded by 12 clusters 1611-1643 of 3 antennas 1651-1653 each, for a total of 36 antennas. All of these antennas are aimed such that when they scatter off of their respective common volumes, the reflected RF reaches the coverage area 1360. Coverage area 1360 has many client antennas, of which 3, 1361-1363 are illustrated. FIG. 16 also indicates the north/south/east/west orientation of the illustration.

FIGS. 17a-c shows the 3 client antennas 1361-1363 in the coverage area 1360 schematically as antennas 1701. FIG. 17a shows the antennas 1701 in an elevation view from the south; FIG. 17b shows the antennas 1701 in an elevation view from the west; and FIG. 17c shows the antennas 1701 in an overhead (plan) view from above. Note the schematic illustration of the antennas 1701 shows them as triangles in the elevation views and as squares in the overhead view, but they are the same antennas. The antennas could be any of many prior art antenna shapes. And, rather than being in a row, the 3 antennas may be located in many different positions relative to each other, including being miles apart. And finally, in one embodiment, far more than 3 antennas are deployed in a given coverage area.

FIG. 17a-c shows how the RF beams from the various antennas in FIG. 16 arrive at a large variety of angles to antennas 1701. For example, antenna cluster 1613's transmission arrives at angle 1713, 1612's transmission arrives at angle 1712, and 1611's transmission arrives at angle 1711. This is due to the fact that the antenna clusters 1613-1615 are positioned successively further from coverage area 1360, but are all aimed to reflect down to coverage area 1360, resulting in varied angles of arrival. Likewise, antenna clusters' 1631-1633's transmission arrive at angles 1731-1733, respectively; clusters 1621-1623 arrive at angles 1721-1723, respectively; and clusters 1641-1643 arrive at angles 1741-1743, respectively.

Additionally, it can be seen in FIG. 17c that transmission from each group of antenna clusters in the north, south, east and west of FIG. 16 arrive from their respective directions, and further the 3 antennas 1651-1653 of antenna cluster 1611 arrive at angles 1751-1753, respectively. And the rest of the individual antennas (not numbered) all arrive at different angles.

All of the varied arrival angles illustrated in FIG. 17a-c result in significant angular diversity. Such diversity can be exploited using either prior art MIMO techniques or the DIDO techniques described herein, or other spatial multiplexing techniques to achieve significant improvements in overall channel bandwidth and SNR. Also, if some of the arrival angles are obstructed from reaching some antennas

1701, then with so many arrival angles, there is a high probability that at least some of the RF arrival angles will reach each antenna.

This same diversity can be exploited in the return path when antennas 1701 transmit back to the various antenna clusters 1611-1643. In one embodiment, some or all of antennas 1701 may be directional and only utilize certain transmission and reception angles. This may be used to either increase the gain off the signal (e.g. using a dish antenna), or can be used to limit the return path transmissions to certain angles to avoid interfering with other receivers using a similar frequency.

Figure 14:
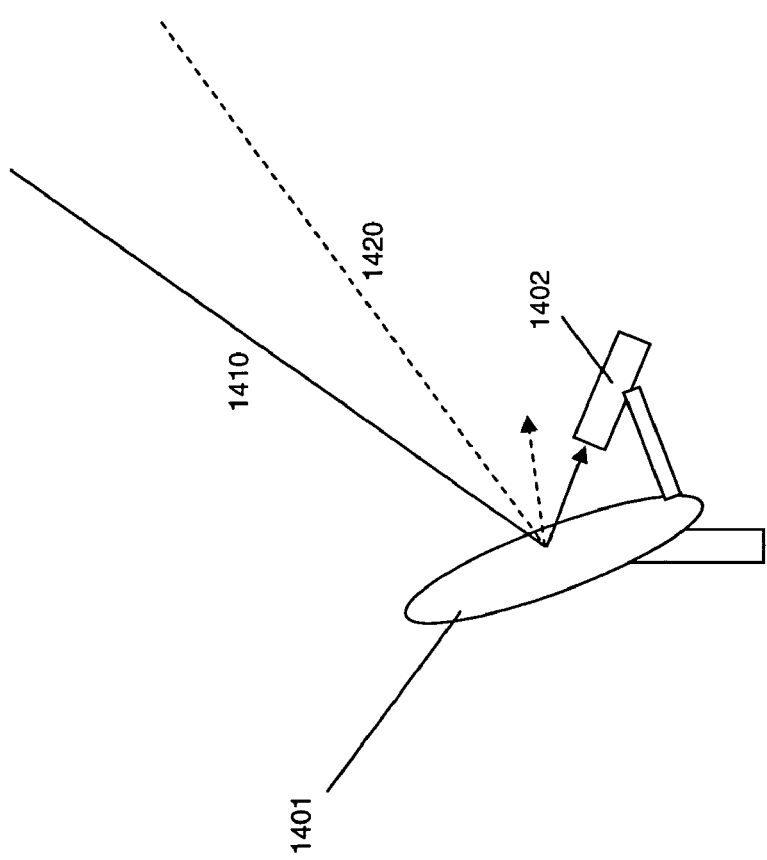
FIG. 14 illustrates a Direct Broadcast Satellite dish and RF signal paths in an embodiment of the invention.

One desirable frequency range to use for tropospheric communications is above 12 GHz. Some of the 12 GHz band is currently used in the US for Direct Broadcast Satellite (DBS) communications. Typically, DBS radio signals are transmitted from geostationary satellites, and a consumer has a dish installed on the roof of his home (or someplace where the dish as a view of the southern sky in the direction of the desired satellite). The satellite signal is received at angle 1410 of FIG. 14, and then is collected by dish 1401 and reflected to antenna and low-noise block (LNB) 1402. Some satellite dishes 1401 are constructed to receive satellite signals from 2 or 3 angles, and reflect them to multiple LNBs 1402. The 12 GHz band is largely unutilized in the US except for this purpose. Because of the high frequency 12 GHz is easily absorbed by various terrestrial objects (e.g. tree leaves) and as a result is difficult to use for other than LOS applications.

In one embodiment of this invention the DIDO troposcatter system described above, and illustrated in FIGS. 11 and 13 is used at the same frequency as DBS satellite transmission 1410, but the base station antennas (either 1102 or 1341-1344) are positioned and angled such that the angle(s) of RF reflection from the common volume(s) 1121 or 1321-1324 are such that they will not be reflected by the satellite dishes 1401 into their LNBs 1402. This can be accomplished by placing the base station antennas 1102 or 1341-1344 at angles so that they never transmit in the same direction as the satellite signal 1410 (e.g. always transmit from the north, since all geosynchronous satellites transmit from the south), or choose an elevation angle for the transmission such that the RF reflection 1420 back to the ground bounces away from the LNBs 1402.

Care must also be used on the return path transmission from the client antennas 1104 or 1361-1363 to the base station so that they do not interfere with LNB 1402. This can be accomplished by using a directional return path antenna, similar to the dish antenna 1401 used to receive the satellite signal.

In an alternative embodiment the 12 GHz troposcatter approach just described not only applies to DIDO systems, but can be also used for 1-way conventional broadcast without return path or spatial multiplexing. In this case, each client receiver would receive the same signal.

Figure 15:
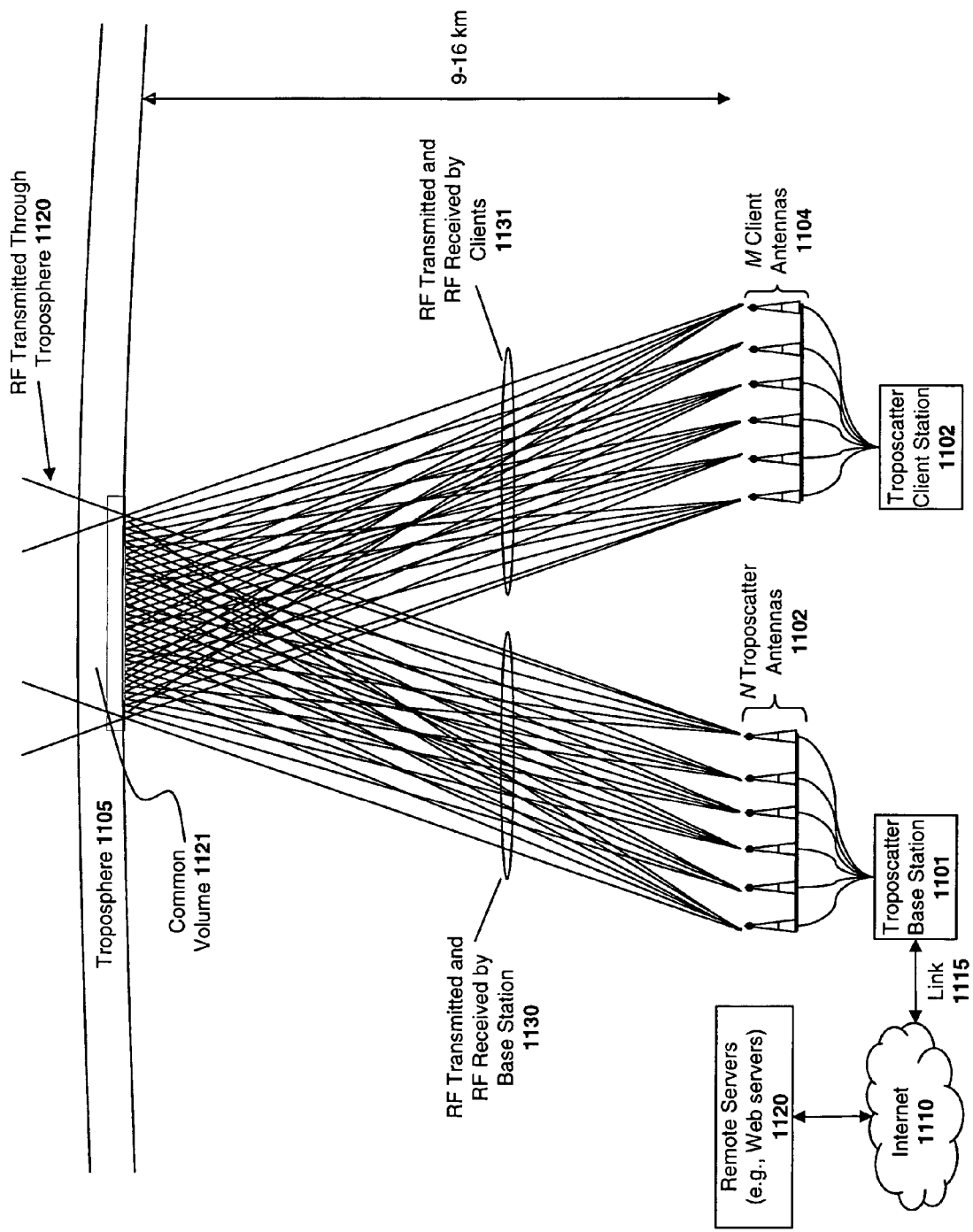
FIG. 15 illustrates an embodiment of the invention employing the use of conventional MIMO with tropospheric scatter.

In an alternative embodiment, conventional 2-way MIMO techniques are used with troposcatter communications, as shown in FIG. 15. In this embodiment, both the base station 1101 and the client station 1102 have multiple antennas, and each receiver creates a full H matrix after training, and then inverts that matrix and multiplies it by the received data from the multiple antennas. The configuration of a conventional MIMO system is show in FIG. 1, Embodiments of the invention may include various steps as set forth above. The steps may be embodied in machine-executable instructions which cause a general-purpose or special-purpose processor to perform certain steps. For example, the various components within the Base Stations and Client Devices described above may be implemented as software executed on a general purpose or special purpose processor. To avoid obscuring the pertinent aspects of the invention, various well known personal computer components such as computer memory, hard drive, input devices, . . . etc, have been left out of the figures.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

In one embodiment, certain modules such as the Coding, Modulation and Signal Processing Logic 603 described above may be implemented on a programmable digital signal processor ("DSP") (or group of DSPs) such as a DSP using a Texas Instruments' TMS320x architecture (e.g., a TMS320C6000, TMS320C5000, . . . etc). The DSP in this embodiment may be embedded within an add-on card to a personal computer such as, for example, a PCI card. Of course, a variety of different DSP architectures may be used while still complying with the underlying principles of the invention.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. Accordingly, the scope and spirit of the present invention should be judged in terms of the claims which follow.

What is claimed is:

1. A method comprising:
   using tropospheric scatter to transmit a training signal from each antenna of a base station to each of a plurality of client devices, each of the client devices analyzing each training signal to generate channel characterization data, and transmitting the channel characterization data back to the base station;
   storing the channel characterization data for each of the plurality of client devices;
   receiving data to be transmitted to each of the client devices; and
   precoding the data using the channel characterization data associated with each respective client device to generate precoded data signals for each antenna of the base station; and
   using tropospheric scatter to transmit the precoded data signals through each antenna of the base station to each respective client device.

2. The method as in claim 1 wherein precoding the data further comprises mapping each of a plurality of data streams to a particular antenna on the base station.

3. The method as in claim 1 further comprising:
polarizing signals from one or more of the antennas of the base station to improve signal diversity.

4. The method as in claim 1 wherein the data is precoded and transmitted using multiple-input multiple-output ("MIMO") signal communication techniques.

5. The method as in claim 1 wherein the data is precoded and transmitted using distributed-input distributed-output ("DIDO") signal communication techniques.

6. The method as in claim 1 wherein the antennas are directional antennas configured to direct signals into the troposphere.

7. The method as in claim 1 wherein the channel state information is stored as a matrix H comprised of separate components measured for each antenna.

8. The method as in claim 1 wherein the data to be precoded and transmitted is received over a data network in response to a client request.

9. A troposcatter communication system comprising:
a network link to receive a data stream over a network, the data stream to be transmitted wirelessly in response to a client request;
a tropospheric scatter base station having a plurality of antennas, the tropospheric scatter base station to:
transmit a training signal from each antenna to each of a plurality of client devices, each of the client devices analyzing each training signal to generate channel characterization data, and transmitting the channel characterization data back to the base station;
store the channel characterization data for each of the plurality of client devices;
receive data to be transmitted to each of the client devices; and
precode the data using the channel characterization data associated with each respective client device to generate precoded data signals for each antenna of the base station; and
transmit the precoded data signals through each antenna of the base station to each respective client device.

10. The system as in claim 9 wherein precoding the data further comprises mapping each of a plurality of data streams to a particular antenna on the base station.

11. The system as in claim 9 further comprising:
polarizing signals from one or more of the antennas of the base station to improve signal diversity.

12. The system as in claim 9 wherein the data is precoded and transmitted using multiple-input multiple-output ("MIMO") signal communication techniques.

13. The system as in claim 9 wherein the data is precoded and transmitted using distributed-input distributed-output ("DIDO") signal communication techniques.

14. The system as in claim 9 wherein the antennas are directional antennas configured to direct signals into the troposphere.

15. The system as in claim 9 wherein the channel state information is stored as a matrix H comprised of separate components measured for each transmit antenna.

16. The system as in claim 9 wherein the data to be precoded and transmitted is received over a data network in response to a client request.

* * * * *